(12) United States Patent
Zhou et al.

(10) Patent No.: US 11,723,034 B2
(45) Date of Patent: Aug. 8, 2023

(54) ACTION TIME SIGNALLING FOR SEMI-PERSISTENT SCHEDULING (SPS) OR CONFIGURED GRANT (CG) REACTIVATION

(71) Applicant: QUALCOMM Incorporated, San Diego, CA (US)

(72) Inventors: Yan Zhou, San Diego, CA (US); Tao Luo, San Diego, CA (US); Hamed Pezeshki, San Diego, CA (US); Konstantinos Dimou, San Francisco, CA (US); Xiaoxia Zhang, San Diego, CA (US); Seyed Ali Akbar Fakoorian, San Diego, CA (US); Sony Akkarakaran, Poway, CA (US); Mostafa Khoshnevisan, San Diego, CA (US); Kazuki Takeda, Yokosuka (JP)

(73) Assignee: QUALCOMM Incorporated, San Diego, CA (US)

(*) Notice: Subject to any disclaimer, the term of this patent is extended or adjusted under 35 U.S.C. 154(b) by 107 days.

(21) Appl. No.: 16/918,502

(22) Filed: Jul. 1, 2020

(65) Prior Publication Data

US 2021/0007088 A1  Jan. 7, 2021

Related U.S. Application Data

(60) Provisional application No. 62/870,350, filed on Jul. 3, 2019.

(51) Int. Cl.
*H04W 72/04* (2023.01)
*H04W 72/23* (2023.01)
*H04W 72/044* (2023.01)

(52) U.S. Cl.
CPC ......... *H04W 72/23* (2023.01); *H04W 72/044* (2013.01)

(58) Field of Classification Search
CPC ............. H04W 72/042; H04W 72/044; H04W 28/18
See application file for complete search history.

(56) References Cited

U.S. PATENT DOCUMENTS

| 2014/0362832 A1 | 12/2014 | Rudolf et al. |
| 2016/0100422 A1 | 4/2016 | Papasakellariou et al. |
| 2018/0139734 A1 | 5/2018 | Babaei et al. |

(Continued)

FOREIGN PATENT DOCUMENTS

| EP | 3437407 A1 | 2/2019 |
| WO | 2013017178 A1 | 2/2013 |

(Continued)

OTHER PUBLICATIONS

Ericsson: "Enhancement of Uplink Grant-Free Transmission for NR URLLC", 3GPP TSG-RAN1 Meeting #94, R1-1808149, Gothenburg, Sweden, Aug. 20, 2018-Aug. 24, 2018, XP051515551, Retrieved from the Internet: URL: http://www.3gpp.org/ftp/tsg%5Fran/WG1%5FRL1/TSGR1%5F94/Docs/R1%2D1808149%2Ezip [retrieved on Aug. 11, 2018] p. 1-p. 7.

(Continued)

*Primary Examiner* — John D Blanton
(74) *Attorney, Agent, or Firm* — Arent Fox, LLP

(57) ABSTRACT

Apparatuses and methods for wireless communication are provided. In an aspect, a user equipment (UE) receives a DCI from a base station, the DCI including an update to a periodically-occurring scheduling, where an absolute time for the update to take effect is specified in an RRC configuration of the DCI. The UE applies the update to the periodically-occurring scheduling for communications of the UE beginning at and following the absolute time. In another aspect, the UE receives at least one downlink communication that updates a plurality of SPS or CG parameters. The UE determines an action time for the update to take effect for each parameter, where the action time is a function of a type of each parameter. The UE applies the update to each (Continued)

parameter for communications of the UE beginning at and following a respective action time.

20 Claims, 9 Drawing Sheets

(56) References Cited

U.S. PATENT DOCUMENTS

| | | | |
|---|---|---|---|
| 2018/0288746 A1* | 10/2018 | Zhang | H04L 1/0031 |
| 2018/0368174 A1 | 12/2018 | Jeon et al. | |
| 2019/0069319 A1* | 2/2019 | Arshad | H04W 72/23 |
| 2019/0159065 A1 | 5/2019 | Kim et al. | |
| 2019/0215781 A1 | 7/2019 | Jeon et al. | |
| 2020/0235861 A1 | 7/2020 | Belleschi et al. | |
| 2020/0404682 A1 | 12/2020 | Zhou | |
| 2021/0045184 A1 | 2/2021 | Sato et al. | |
| 2021/0167930 A1 | 6/2021 | Jeon et al. | |
| 2021/0266932 A1 | 8/2021 | Liu et al. | |

FOREIGN PATENT DOCUMENTS

| | | |
|---|---|---|
| WO | 2018019085 A1 | 2/2018 |
| WO | 2020030693 A1 | 2/2020 |

OTHER PUBLICATIONS

Ericssom: "Handling of SPS and CS Reconfiguration", 3GPP TSG-RAN WG2 AH 1807, R2-1810183,Montreal, Canada, Jul. 2, 2018-Jul. 6, 2018, XP051467383, pp. 1-4, Retrieved from the Internet: URL: http://www.3gpp.org/ftp/Meetings%5F3GPP%5FSYNC/RAN2/Docs [retrieved on Jul. 1, 2018] Paragraph [02.3].

Interdigital Inc: "On PDCCH Enhancements for eURLLC", 3GPP TSG RAN WG1 #97; R1-1907110, Reno, USA; Apr. 13, 2019-Apr. 17, 2019, Retrieved from the Internet: URL:http://www.3gpp.org/ftp/Meetings%5F3GPP%5FSYNC/RAN1/Docs/R1%2D1907110%2Ezip [retrieved on May 13, 2019] p. 1-p. 3.

International Search Report and Written Opinion—PCT/US2020/040777—ISA/EPO—dated Oct. 29, 2020.

Qualcomm Incorporated: "PDCCH-based PowerSaving Channel Design," 3GPP TSG-RAN WG1 #97, R1-1907294, Reno, USA, May 13, 2019-May 17, 2019, XP051728734, Retrieved from the Internet: URL: http://www.3gpp.org/ftp/Meetings%5F3GPP%5FSYNC/RAN1/Docs/R1%2D1907294%2Ezip [retrieved on May 13, 2019] paragraph [2.2.3.1]-paragraph [2.2 3.3], p. 1-p. 15.

Partial International Search Report—PCT/US2020/040777—ISA/EPO—dated Sep. 7, 2020.

* cited by examiner

ACTION TIME SIGNALLING FOR SEMI-PERSISTENT SCHEDULING (SPS) OR CONFIGURED GRANT (CG) REACTIVATION

CROSS REFERENCE TO RELATED APPLICATION(S)

This application claims the benefit of U.S. Provisional Application Ser. No. 62/870,350, entitled "ACTION TIME SIGNALLING FOR SEMI-PERSISTENT SCHEDULING (SPS) OR CONFIGURED GRANT (CG) REACTIVATION" and filed on Jul. 3, 2019, which is expressly incorporated by reference herein in its entirety.

BACKGROUND

The present disclosure relates generally to communication systems, and more particularly, to semi-persistent scheduling (SPS).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In some cases, a configured grant (CG) may refer to a mode where some resources in an uplink are pre-configured for a user equipment (UE). As such, the UE may use the CG for autonomous uplink data transmission when the UE has data, without the UE having to transmit a scheduling request and receive an explicit uplink grant on a physical downlink control channel (PDCCH) for the specific resource. In some cases, semi-persistent scheduling (SPS) may provide for the scheduling of a periodic uplink or downlink communication for a UE. For example, a base station, such as a gNodeB (gNB), may configure and activate downlink SPS to schedule a UE to receive a periodic physical downlink shared channel (PDSCH) without a PDCCH for every transmission. Similarly, the gNB may configure and activate uplink SPS to schedule a UE to transmit on a periodic physical uplink shared channel (PUSCH) without a physical uplink control channel (PUCCH) for every transmission.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In aspects of the disclosure, methods, computer-readable mediums, and apparatuses are provided.

In an aspect, a method of wireless communication for a user equipment (UE) includes receiving, by the UE, an activation/reactivation downlink control information (DCI) from a base station, the activation/reactivation DCI including an update to a periodically-occurring scheduling, where an absolute time for the update to take effect is specified in a radio resource control (RRC) configuration of the activation/reactivation DCI. The method further includes applying the update to the periodically-occurring scheduling for communications of the UE beginning at and following the absolute time.

In a further aspect, a method of wireless communication for a UE includes receiving, by the UE, at least one downlink communication from a base station, the at least one downlink communication including an update to a plurality of semi-persistent scheduling (SPS) or configured grant (CG) parameters. The method further includes determining an action time for the update to take effect for each of the plurality of SPS or CG parameters, where the action time is a function of a type of each of the plurality of SPS or CG parameters, where the action time is selected from a group including at least a first action time associated with a first type of parameter and a second action time associated with a second type of parameter, the second action time being different than the first action time. The method further includes applying the update to respective ones of the plurality of SPS or CG parameters for communications of the UE beginning at and following each respective action time for the respective ones of the plurality SPS or CG parameters.

In another aspect, a UE for wireless communication includes a transceiver, a memory configured to store instructions, and one or more processors communicatively coupled with the transceiver and the memory. The one or more processors are configured to execute the instructions to receive, by the UE, an activation/reactivation DCI from a base station, the activation/reactivation DCI including an update to a periodically-occurring scheduling, where an absolute time for the update to take effect is specified in an RRC configuration of the activation/reactivation DCI. The one or more processors are further configured to execute the instructions to apply the update to the periodically-occurring scheduling for communications of the UE beginning at and following the absolute time.

In a further aspect, a UE for wireless communication includes a transceiver, a memory configured to store instructions, and one or more processors communicatively coupled with the transceiver and the memory. The one or more processors are configured to execute the instructions to receive, by the UE, at least one downlink communication from a base station, the at least one downlink communication including an update to a plurality of SPS or CG parameters. The one or more processors are further configured to execute the instructions to determine an action time for the update to take effect for each of the plurality of SPS or CG parameters, where the action time is a function of a type of each of the plurality of SPS or CG parameters, where the action time is selected from a group including at least a first action time associated with a first type of parameter and a second action time associated with a second type of parameter, the second action time being different than the first action time. The one or more processors are further configured to execute the instructions to apply the update to respective ones of the plurality of SPS or CG parameters for communications of the UE beginning at and following each respective action time for the respective ones of the plurality SPS or CG parameters.

In a yet another aspect, an apparatus for wireless communication includes means for receiving, by a UE, an activation/reactivation DCI from a base station, the activation/reactivation DCI including an update to a periodically-occurring scheduling, where an absolute time for the update to take effect is specified in an RRC configuration of the activation/reactivation DCI. The apparatus further includes means for applying the update to the periodically-occurring scheduling for communications of the UE beginning at and following the absolute time.

In a further aspect, an apparatus for wireless communication includes means for receiving, by a UE, at least one downlink communication from a base station, the at least one downlink communication including an update to a plurality of SPS or CG parameters. The apparatus further includes means for determining an action time for the update to take effect for each of the plurality of SPS or CG parameters, where the action time is a function of a type of each of the plurality of SPS or CG parameters, where the action time is selected from a group including at least a first action time associated with a first type of parameter and a second action time associated with a second type of parameter, the second action time being different than the first action time. The apparatus further includes means for applying the update to respective ones of the plurality of SPS or CG parameters for communications of the UE beginning at and following each respective action time for the respective ones of the plurality SPS or CG parameters.

In another aspect, a computer-readable medium includes code executable by one or more processors to receive, by a UE, an activation/reactivation DCI from a base station, the activation/reactivation DCI including an update to a periodically-occurring scheduling, where an absolute time for the update to take effect is specified in an RRC configuration of the activation/reactivation DCI. The computer-readable medium further includes code executable by the one or more processors to apply the update to the periodically-occurring scheduling for communications of the UE beginning at and following the absolute time.

In a further aspect, a computer-readable medium includes code executable by one or more processors to receive, by a UE, at least one downlink communication from a base station, the at least one downlink communication including an update to a plurality of SPS or CG parameters. The computer-readable medium further includes code executable by the one or more processors to determine an action time for the update to take effect for each of the plurality of SPS or CG parameters, where the action time is a function of a type of each of the plurality of SPS or CG parameters, where the action time is selected from a group including at least a first action time associated with a first type of parameter and a second action time associated with a second type of parameter, the second action time being different than the first action time. The computer-readable medium further includes code executable by the one or more processors to apply the update to respective ones of the plurality of SPS or CG parameters for communications of the UE beginning at and following each respective action time for the respective ones of the plurality SPS or CG parameters.

In an aspect, a method of wireless communication for a base station includes transmitting, by the base station, an activation/reactivation DCI to a UE, the activation/reactivation DCI including an update to a periodically-occurring scheduling, where an absolute time for the update to take effect is specified in an RRC configuration of the activation/reactivation DCI. The method further includes applying the update to the periodically-occurring scheduling for communications with the UE beginning at and following the absolute time.

In a further aspect, a method of wireless communication for a base station includes transmitting, by the base station, at least one downlink communication to a UE, the at least one downlink communication including an update to a plurality of SPS or CG parameters. The method further includes determining an action time for the update to take effect for each of the plurality of SPS or CG parameters, where the action time is a function of a type of each of the plurality of SPS or CG parameters, where the action time is selected from a group including at least a first action time associated with a first type of parameter and a second action time associated with a second type of parameter, the second action time being different than the first action time. The method further includes applying the update to respective ones of the plurality of SPS or CG parameters for communications with the UE beginning at and following each respective action time for the respective ones of the plurality SPS or CG parameters.

In another aspect, a base station for wireless communication includes a transceiver, a memory configured to store instructions, and one or more processors communicatively coupled with the transceiver and the memory. The one or more processors are configured to execute the instructions to transmit, by the base station, an activation/reactivation DCI to a UE, the activation/reactivation DCI including an update to a periodically-occurring scheduling, where an absolute time for the update to take effect is specified in an RRC configuration of the activation/reactivation DCI. The one or more processors are further configured to execute the instructions to apply the update to the periodically-occurring scheduling for communications with the UE beginning at and following the absolute time.

In a further aspect, a base station for wireless communication includes a transceiver, a memory configured to store instructions, and one or more processors communicatively coupled with the transceiver and the memory. The one or more processors are configured to execute the instructions to transmit, by the base station, at least one downlink communication to a UE, the at least one downlink communication including an update to a plurality of SPS or CG parameters. The one or more processors are further configured to execute the instructions to determine an action time for the update to take effect for each of the plurality of SPS or CG parameters, where the action time is a function of a type of each of the plurality of SPS or CG parameters, where the action time is selected from a group including at least a first action time associated with a first type of parameter and a second action time associated with a second type of parameter, the second action time being different than the first action time. The one or more processors are further configured to execute the instructions to apply the update to respective ones of the plurality of SPS or CG parameters for communications with the UE beginning at and following each respective action time for the respective ones of the plurality SPS or CG parameters.

In yet another aspect, an apparatus for wireless communication includes means for transmitting, by a base station, an activation/reactivation DCI to a UE, the activation/reactivation DCI including an update to a periodically-occurring scheduling, where an absolute time for the update to take effect is specified in an RRC configuration of the activation/reactivation DCI. The apparatus further includes means for applying the update to the periodically-occurring scheduling for communications with the UE beginning at and following the absolute time.

In a further aspect, an apparatus for wireless communication includes means for transmitting, by a base station, at least one downlink communication to a UE, the at least one downlink communication including an update to a plurality of SPS or CG parameters. The apparatus further includes means for determining an action time for the update to take effect for each of the plurality of SPS or CG parameters, where the action time is a function of a type of each of the plurality of SPS or CG parameters, where the action time is selected from a group including at least a first action time associated with a first type of parameter and a second action time associated with a second type of parameter, the second action time being different than the first action time. The apparatus further includes means for applying the update to respective ones of the plurality of SPS or CG parameters for communications with the UE beginning at and following each respective action time for the respective ones of the plurality SPS or CG parameters.

In another aspect, a computer-readable medium includes code executable by one or more processors to transmit, by a base station, an activation/reactivation DCI to a UE, the activation/reactivation DCI including an update to a periodically-occurring scheduling, where an absolute time for the update to take effect is specified in an RRC configuration of the activation/reactivation DCI. The computer-readable medium further includes code executable by the one or more processors to apply the update to the periodically-occurring scheduling for communications with the UE beginning at and following the absolute time.

In a further aspect, a computer-readable medium includes code executable by one or more processors to transmit, by a base station, at least one downlink communication to a UE, the at least one downlink communication including an update to a plurality of SPS or CG parameters. The computer-readable medium further includes code executable by the one or more processors to determine an action time for the update to take effect for each of the plurality of SPS or CG parameters, where the action time is a function of a type of each of the plurality of SPS or CG parameters, where the action time is selected from a group including at least a first action time associated with a first type of parameter and a second action time associated with a second type of parameter, the second action time being different than the first action time. The computer-readable medium further includes code executable by the one or more processors to apply the update to respective ones of the plurality of SPS or CG parameters for communications with the UE beginning at and following each respective action time for the respective ones of the plurality SPS or CG parameters.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
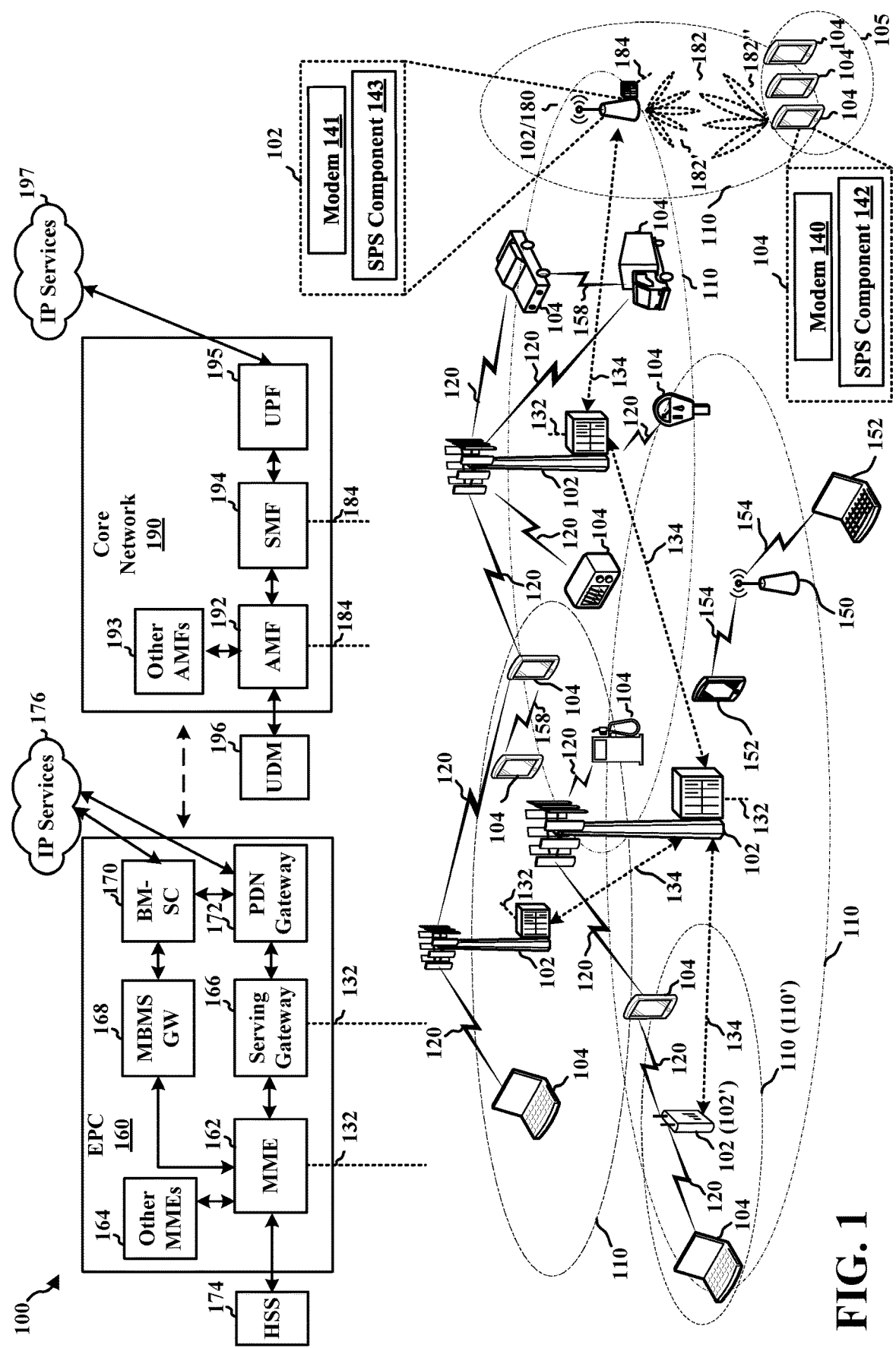
FIG. 1 is a diagram illustrating an example of a wireless communications system and an access network including components for updating semi-persistent scheduling (SPS) or configured grant (CG) parameters for multiple user equipments (UEs), in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

Some present aspects relate to simultaneously updating semi-persistent scheduling (SPS) or configured grant (CG) parameters for multiple user equipments (UEs), for example, by configuring a common target action time, such as an absolute time, for updated SPS or CG parameters to take effect for multiple UEs. As used herein, the term "simultaneous updating" means that an update takes effect at a common or same time, such as in a synchronized manner. For example, the common or same time may be the common target action time across multiple UEs. It should be understood that the actual transmission of the updated SPS or CG parameters, or reception of such parameters at each UE, may occur at different times.

In some implementations, for example, in order to have synchronized updates across multiple UEs, a UE-specific action time for updated parameters to take effect may be signaled to each UE. Accordingly, different UEs may have a common update time even if updated parameters are signaled at different times.

In an aspect, for example, for each SPS/CG reactivation DCI, the RRC configuration may specify an absolute time for the updated parameters to take effect. For example, the absolute time may be after the end of the DCI, e.g., the next boundary within a set of periodic time boundaries. In an aspect, for example, the set of periodic time boundaries may start from an absolute time, e.g., the start of the frame with system frame number (SFN)=0. In an aspect, the period may be expressed in terms of frames, slots, symbols, etc.

In an alternative or additional aspect, the action time for updated parameters to take effect may be different for different parameters or sets. For example, in one non-limiting aspect, beam update may take effect 2 slots later after the DCI, while time-domain resource allocation update may take effect 10 slots later after the DCI. In an aspect, different action times may be signaled in the DCI, MAC-CE, or RRC message.

In an alternative or additional aspect, the action time may be applied to parameters other than DL/UL scheduling offset from the (re)activation DCI to the first scheduled PDSCH/PUSCH in terms of slots, e.g., K0/K2 as signaled in DCI. For example, in an aspect, the scheduled PDSCH/PUSCH after the DCI but before the action time may use previous parameters, except for K0/K2. In an aspect, the action time may be signaled as K0/K2 plus a certain delta.

In an aspect, for example, there may be a duration between the reactivation DCI and the first updated scheduled PDSCH/PUSCH based on the updated scheduling offset indicated in the DCI, e.g. K0/K2. Such a duration is hereinafter referred to as a transient duration. In some aspects, in the transient duration, there may be PDSCH/PUSCH occasions based on the previous SPS/CG configuration. Whether transmission is allowed on such PDSCH/PUSCH occasions may be according to one of the following optional aspects: (1) No PDSCH/PUSCH transmission is allowed in the transient duration. That is, the first PDSCH/PUSCH transmission after the DCI is indicated by the K0/K2 in the DCI; (2) PDSCH/PUSCH transmission based on the previous SPS/CG configuration is still allowed in the transient duration (however, the uplink feedback resource (e.g., PUCCH) of the last PDSCH in the transient duration should be before the first updated scheduled PDSCH indicated by K0 in the DCI, at least when the last PDSCH in the transient duration and the first updated scheduled PDSCH have the same HARQ ID); (3) PDSCH/PUSCH transmission based on previous SPS/CG configuration is still allowed in the transient duration, and the last transmission in the transient duration may be on the occasion before the first updated scheduled PDSCH/PUSCH but should have no overlap with the first updated scheduled PDSCH/PUSCH.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 including UEs 104 that may be configured and activated by a base station 102 (e.g., a gNB) for SPS functionality. More specifically, for example, a UE 104 may include a modem 140 and an SPS component 142 configured to receive a physical downlink shared channel (PDSCH) from a base station 102 according to an SPS configuration, and/or to receive and implement updated SPS or CG parameters. The UE 104, modem 140, and/or SPS component 142 may be correspondingly configured to transmit a physical uplink shared channel (PUSCH) to the base station 102. The base station 102 may include a modem 141 and an SPS component 143 configured to transmit the PDSCH to one or more of the UEs 104. The base station 102, modem 141, and/or SPS component 143 may be correspondingly configured to receive the PUSCH from the UE 104. In an aspect, the base station 102 and SPS component 143 may generate and transmit SPS or configured grant (CG) parameters for multiple UEs 105 served by the base station 102 that may be updated to take effect across the multiple UEs 105 in a synchronized manner, for example, by configuring a common target action time for the updated SPS or CG parameters to take effect for the multiple UEs 105.

Further details of the present aspects are described below.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158, e.g., including synchronization signals. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same (e.g., 5 GHz, or the like) unlicensed frequency spectrum as may be used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include an eNB, gNodeB (gNB), or another type of base station. Some base stations, such as gNB 180 may operate in a traditional sub-6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
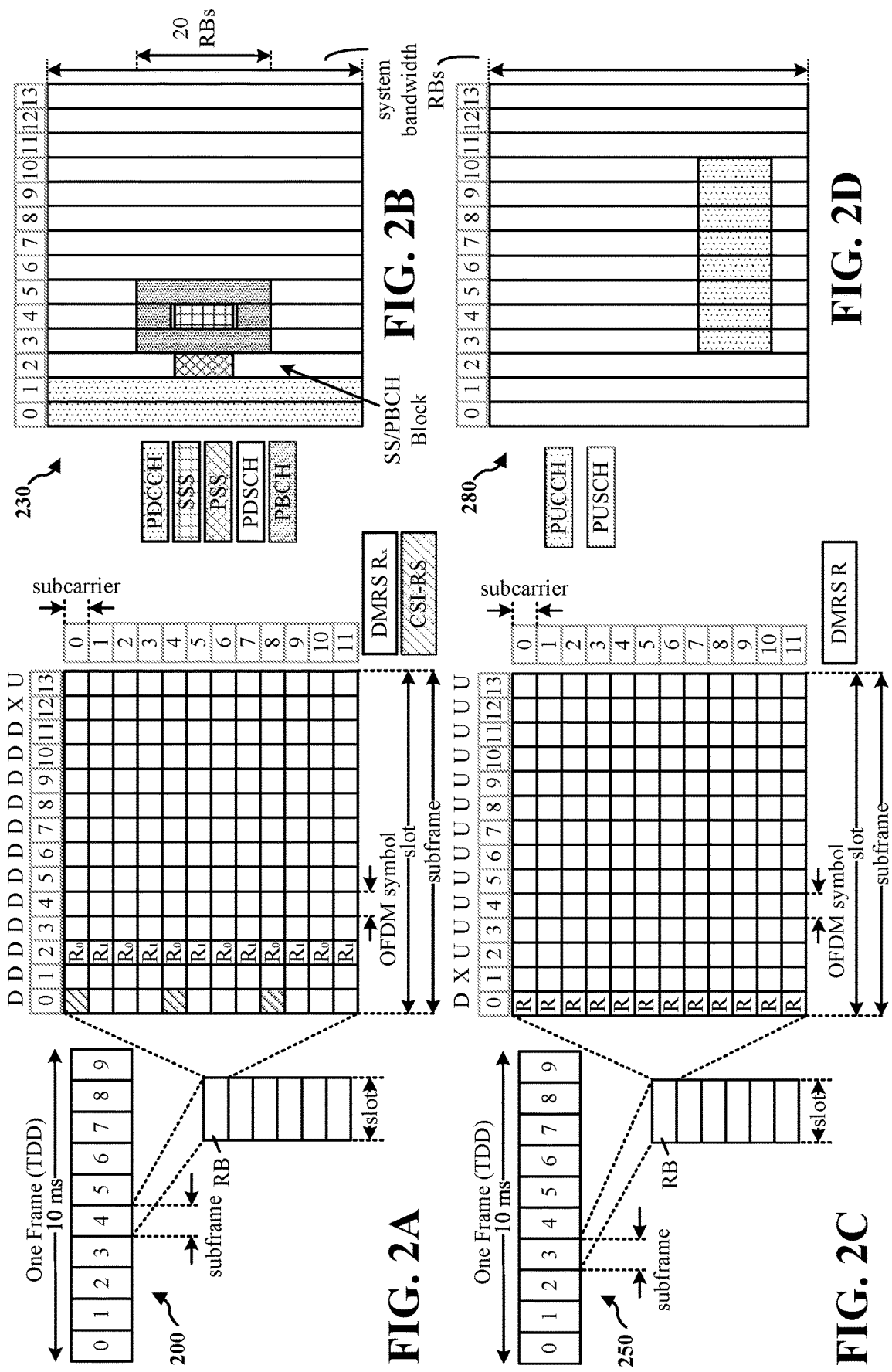
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

Referring to FIGS. 2A-2D, one or more example frame structures, channels, and resources may be used for communication between the base stations 102 and UEs 104 of FIG. 1. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
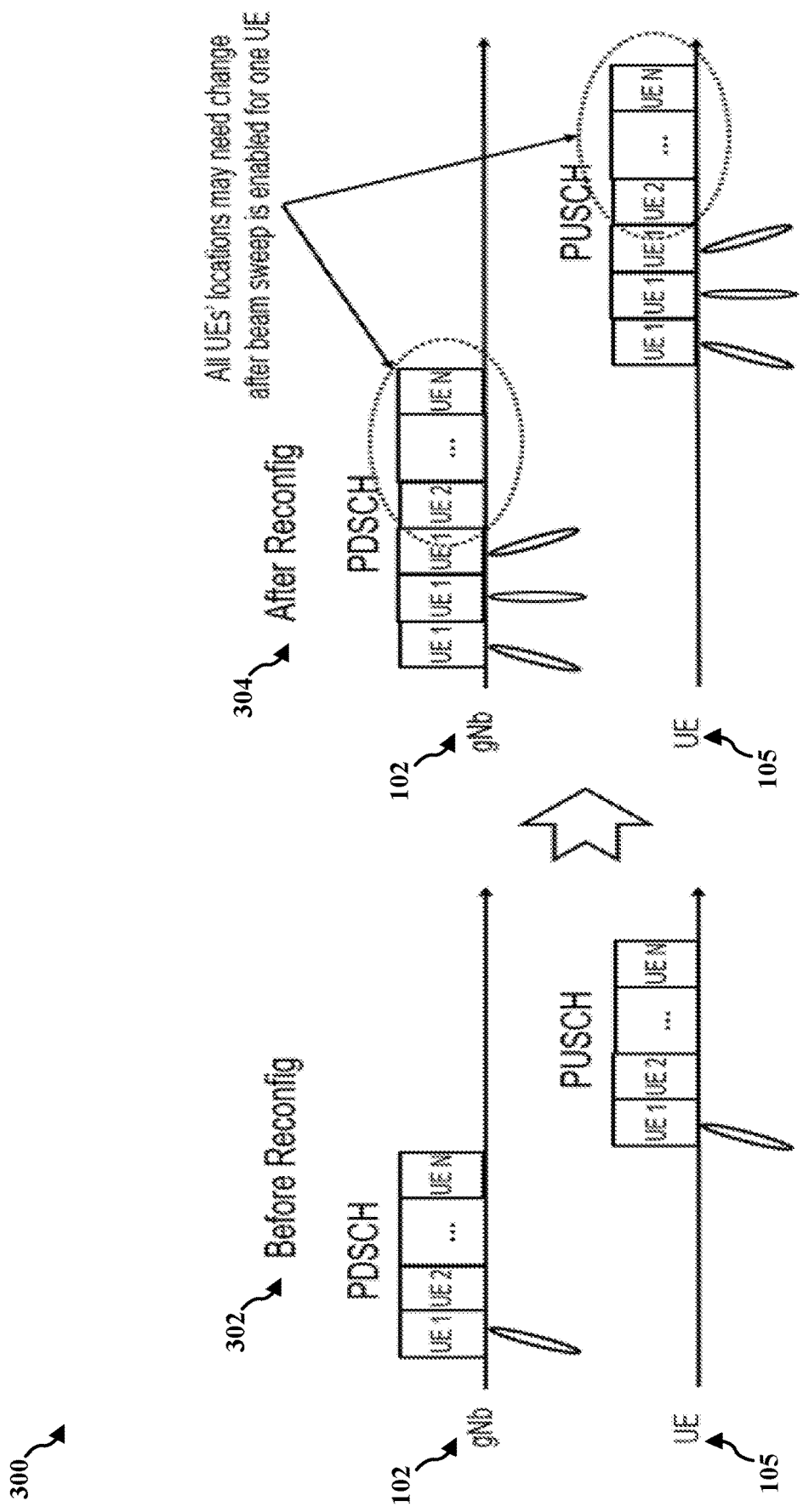
FIG. 3 is a diagram illustrating example downlink and uplink signaling for SPS before and after an SPS/CG parameter reconfiguration, in accordance with various aspects of the present disclosure.

Referring to FIG. 3, an example diagram 300 includes downlink (e.g., PDSCH) and uplink (e.g., PUSCH) resource timing before 302 and after 304 an SPS or CG parameter update or reconfiguration. For example, a group of UEs 105 (e.g., UE 1, UE 2, . . . , UE N) may be configured and activated by a base station such as a gNB 102 for SPS functionality. Generally, SPS may provide for the scheduling of a periodic communication (e.g., an uplink communication or a downlink communication) for a UE. For example, the gNB 102 may configure and activate downlink SPS to schedule the UEs 105 to receive a PDSCH without a PDCCH for every transmission. Similarly, the gNB 102 may configure and activate uplink SPS to schedule the UEs to transmit a PUSCH without a PUCCH for every transmission.

The base station 102 may configure and/or activate the UEs 105 for SPS using at least one of a downlink control information (DCI), a medium access control-control element (MAC-CE, e.g., MAC layer control signaling in the payload), or a radio resource control (RRC) signaling. SPS configuration may include parameters such as a periodicity, a hybrid automatic repeat request (HARQ) resource on PUCCH, a number of HARQ processes for SPS, beam configuration, transmission spacing (K0), transmission delay (K1), feedback spacing (K2), etc. The HARQ resource may carry an ACK or NACK indicating whether the PDSCH was correctly received. For example, in an aspect, SPS activation may be carried on a PDCCH DCI. A transmission spacing, which may be referred to as a K0 value, may be defined as a time gap between a downlink grant (e.g., a reactivation DCI) and corresponding downlink data (e.g., PDSCH) reception. A feedback spacing, which may be referred to as a K2 value, may be defined as a time gap between a downlink grant (e.g., a reactivation DCI) and a corresponding uplink feedback transmission. A transmission delay, which may be referred to as a K1 value, may be defined as a time gap between downlink data (e.g., PDSCH) reception and a corresponding uplink feedback transmission. Each of K0, K1, or K2 may be, for example, 1 slot, 2 slots, 3 slots, 4 slots, 0.1 millisecond (ms), 0.2 ms, 0.5 ms, 1 ms, or other durations.

The DCI may specify additional parameters of the SPS for the PDSCH, such as frequency domain resources, time domain resources, a modulation and coding scheme (MCS), a demodulation reference signal port (DMRS), a scrambling identifier for DMRS sequence generation, transmission configuration indicator (TCI) state, quasi co-location (QCL) type, beam to use and/or beam sweep, etc.

Still referring to FIG. 3, for example, in an aspect, the gNB 102 may configure "UE 1, UE 2, ..., UE N" in the group of UEs 105 for SPS, and may reconfigure the SPS for "UE 1, UE 2, ..., UE N" at a later time by SPS reconfiguration/reactivation. For example, before SPS reconfiguration/reactivation, for each one of "UE 1, UE 2, ..., UE N," the gNB 102 my configure downlink and uplink transmission using a particular beam. For example, on the downlink, the gNB 102 may transmit two symbols to each of "UE 1, UE 2, ..., UE N" back to back on PDSCH using a respective beam. On the uplink, "UE 1, UE 2, ..., UE N" may each be configured by the gNB 102 with an uplink grant to transmit two symbols to the gNB 102 back to back on PUSCH using a respective beam.

Subsequently, for example, in one non-limiting aspect, if the gNB 102 determines that transmissions of "UE 1" have high block error rate (BLER), the gNB 102 may make the transmissions of "UE 1" more robust, for example, by reconfiguring/reactivating SPS or CG configuration of "UE 1" to enable replication by beam sweep. For example, the gNB 102 may reconfigure/reactivate "UE 1" so that each uplink and/or downlink packet of "UE 1" is sent by multiple beams (e.g., 3 different beams), either simultaneously, if the hardware allows this option, or sequentially in time. Accordingly, if one beam gets blocked, the packet of "UE 1" may still be communicated via one of the other beams, thus improving reliability.

In an aspect, SPS/CG parameters per UE for the group of UEs 105 being served by the gNB 102 may need to be updated simultaneously, e.g., to take effect in a synchronized manner, for the group of UEs 105. For example, if "UE 1" is reconfigured/reactivated with beam sweep-based replication (e.g., receiving/transmitting each packet using three beams as in FIG. 3), the resource location offsets for the other UEs in the group of UEs 105 may need to be updated at the same time, e.g., at a common starting point, that such a beam sweep is enabled for "UE 1" in order to avoid errors or conflicts in the communications or to improve efficiency.

In an aspect, resource location offsets for the other UEs (UE 2, ..., UE N) may have to be updated such as to minimize the total duration of SPS/CG transmissions for the entire group of UEs 105.

In some implementations, for example, in order to have synchronized updates across multiple UEs, a UE-specific action time for updated parameters to take effect may be signaled to each UE. Accordingly, different UEs may have a common update time (e.g., an absolute time) even if updated parameters are signaled to different UEs at different times.

In an aspect, for example, multiple DCIs may be transmitted at different points in time to update SPS/CG parameters of multiple UEs. However, the DCIs may indicate action times with absolute values so that the updates take effect simultaneously for all the UEs. Accordingly, in an aspect, for example, the transmissions to "UE 1" do not necessarily have to immediately affect the timing of all the other UEs, and the configuration updates to the other UEs may be pushed at a later time if the other UEs are not immediately/directly affected by the updates of "UE 1." Such flexibility may improve communication reliability/ stability, since a poor performance incident of "UE 1" does not necessarily require/cause an immediate update to all UEs, e.g., changes to "UE 1" may take effect after the transmissions of the other UEs have completed.

In an aspect, for example, for each SPS/CG reactivation DCI, the RRC configuration may specify an absolute time for the updated parameters to take effect. For example, the absolute time may be after the end of the transmission of the DCI, e.g., the next boundary within a set of periodic time boundaries. In an aspect, for example, the set of periodic time boundaries may start from an absolute time, e.g., the start of the frame with SFN=0. For example, in one non-limiting aspect, the reconfigured SPS/CG parameters for each UE may take effect at the start of the next frame, thus resulting in synchronized updates for all UEs. In an aspect, the period may be expressed in terms of frames, slots, symbols, etc.

In an alternative or additional aspect, the action time for updated parameters to take effect may be different for different parameters and/or different sets of parameters. For example, in one non-limiting aspect, beam update may take effect 2 slots later after the DCI, while time-domain resource allocation update may take effect 10 slots later after the DCI. In an aspect, different action times may be signaled in the DCI, MAC-CE, or RRC message.

In an aspect, for example, the parameters to be updated by a (re)activation DCI may include one or more downlink and/or uplink scheduling offsets such as K0 (e.g., transmission spacing from the (re)activation DCI to the corresponding PDSCH) or K2 (e.g., feedback spacing from the (re) activation DCI to the corresponding PUSCH). In this case, the action time may be applicable only to parameters other than the downlink/uplink scheduling offsets from the (re) activation DCI to the first scheduled PDSCH/PUSCH in terms of slots, e.g., K0/K2 as signaled in DCI. For example, in an aspect, a scheduled PDSCH/PUSCH located after the DCI but before the action time may use the updated K0/K2 as signaled by the DCI but may continue to use any other previous/old parameters even if such other parameters are also updated by the DCI. Accordingly, K0/K2 may be updated in a different timeline as compared to other SPS/CG parameters.

In an aspect, the action time may be signaled as K0/K2 plus certain delta. For example, in an aspect, the action time for parameters other than K0/K2 may be indicated in terms of a delay with respect to the K0/K2.

In an aspect, for example, there may be a duration between the (re)activation DCI and the first updated scheduled transmission (PDSCH/PUSCH) that is based on an updated scheduling offset indicated in the DCI, e.g., a K0/K2. Such a duration is hereinafter referred to as a transient duration. In some aspects, in the transient duration, there may be transmission occasions (e.g., PDSCH/PUSCH) based on a previous SPS/CG configuration. Whether transmission is allowed on such occasions may be according to one of the following optional/alternative aspects.

In one optional aspect, for example, no PDSCH/PUSCH transmission according to the previous SPS/CG configuration is allowed in the transient duration. That is, the first PDSCH/PUSCH transmission after the (re)activation DCI is according to the K0/K2 indicated in the (re)activation DCI.

In another optional aspect, for example, PDSCH/PUSCH transmission based on the previous SPS/CG configuration is still allowed in the transient duration. However, for such transmissions, the uplink feedback resource (e.g., PUCCH) of the last PDSCH according to the previous SPS/CG configuration should be before the first scheduled PDSCH according to the K0 indicated in the (re)activation DCI. For example, in an aspect, when the last PDSCH according to the previous SPS/CG configuration and the first scheduled PDSCH according to the K0 indicated in the (re)activation DCI have the same HARQ ID, the ACK for the last PDSCH according to the previous SPS/CG configuration should precede the first scheduled PDSCH according to the K0 indicated in the (re)activation DCI. Accordingly, the 3GPP requirement that the next data should follow the last acknowledgement is met.

In a further optional aspect, for example, the aforementioned 3GPP requirement may be removed. For example, in an aspect, PDSCH/PUSCH transmission based on previous SPS/CG configuration is still allowed in the transient duration, and the last transmission in the transient duration according to the previous SPS/CG configuration may be on the occasion before the first scheduled PDSCH/PUSCH according to the update in the (re)activation DCI. However, the last transmission in the transient duration according to the previous SPS/CG configuration should not overlap with the first scheduled PDSCH/PUSCH according to the update in the (re)activation DCI.

Figure 4:
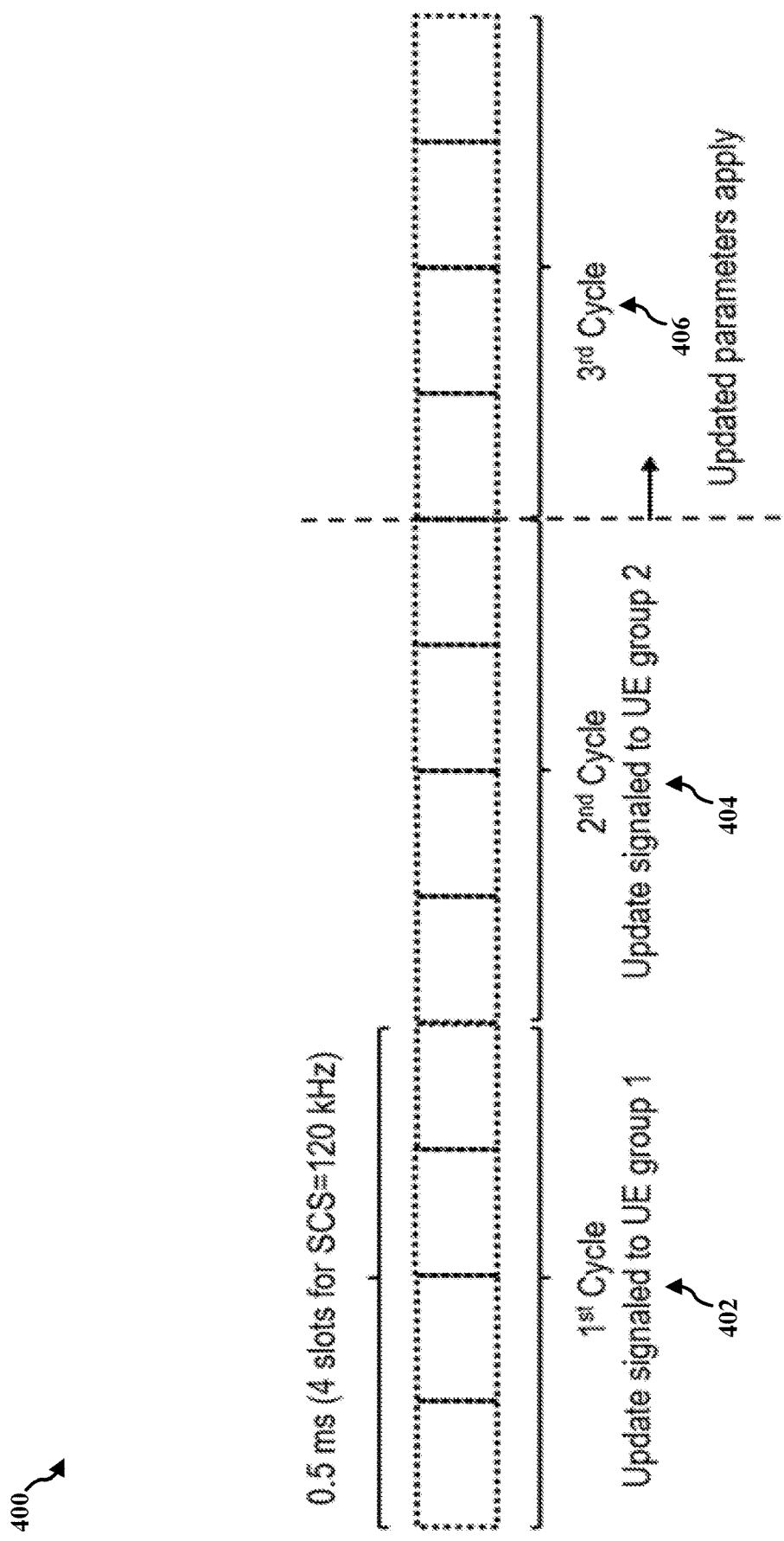
FIG. 4 is a diagram illustrating example cycles for signaling and application of an SPS/CG configuration update, in accordance with various aspects of the present disclosure.

Referring to FIG. 4, in one optional non-limiting aspect, for example, the SPS/CG communications of the group of UEs 105 may be configured to be repeated in periodic cycles, such as a first cycle 402, a second cycle 404, a third cycle 406, etc. In an aspect, a single cycle may be too short to finish updating SPS/CG parameters for all of "UE 1, UE 2, . . . , UE N" so that the updates can be applied in a next/subsequent cycle.

For example, for a subcarrier spacing (SCS) of 120 KHz, each cycle is 0.5 ms. In this case, a 0.5 ms cycle duration includes 4 slots and may include at most 12 PDCCH symbols (3 PDCCH symbols per slot), which may be used to update SPS/CG parameters for at most 12 UEs via DCI. In addition, sufficient time should be reserved for PDCCH decoding. For example, due to decoding latency, the last 2 slots of a cycle may not be used to send PDCCH for SPS/CG parameter updates that need to be applied at the start of the next cycle. More specifically, if PDCCH symbols are transmitted in the last 2 slots of a cycle, a UE may not finish decoding those PDCCH symbols before the start of the next cycle. Therefore, any SPS/CG parameter updates via PDCCH symbols transmitted in the last 2 slots of a cycle may not take effect at the start of the next cycle, and a UE may not be able to apply such parameters at the start of the next cycle. Accordingly, when a cycle includes 4 slots, only the first 2 slots of the cycle may be used for SPS/CG parameter update of at most 6 UEs. However, the group of UEs 105 may include more than 6 UEs (e.g., may include 10 or 20 UEs).

Accordingly, in some present aspects, to address the above, a common "action time" may be configured for synchronized updates for all UEs in the group of UEs 105 to take effect. For example, in an aspect, each activation/reactivation DCI or MAC-CE or RRC signaling for each UE may indicate a target action time for updated SPS/CG parameters to take effect for that UE, and such target action time may be common for multiple UEs 105.

For example, in an aspect, due to the number of UEs in the group of UEs 105, the group of UEs 105 may be split into two subgroups of UEs, and an activation/reactivation DCI in the first cycle 402 may indicate updated SPS/CG parameters for each UE in the first sub-group of UEs. Further, an activation/reactivation DCI in the second cycle 404 may indicate updated SPS/CG parameters for each UE in the second sub-group of UEs. In addition, in an aspect, each of the aforementioned activation/reactivation DCIs may also indicate a target action time common for the updated SPS/ CG parameters to take effect for both sub-groups of UEs. For example, in an aspect, each of the aforementioned activation/reactivation DCIs may also indicate that for both sub-groups of UEs, the updated SPS/CG parameters should take effect at the start of the third cycle 406. As such, SPS/CG parameters may be updated simultaneously for the entire group of UEs 105 to take effect at the beginning of the third cycle 406.

In an aspect, for example, the action time used to align SPS/CG parameter update time across multiple UEs may be indicated in the activation/reactivation DCI or MAC-CE or RRC signaling transmitted by the gNB 102 to update such SPS/CG parameters.

In an aspect, the absolute time may be expressed, for example, in an absolute unit of time such as a frame index, subframe index, slot index, symbol index, etc.

In a further aspect, the action time may be a relative time offset from the activation/reactivation DCI or MAC-CE or RRC signaling transmitted by the gNB 102 to update the SPS/CG parameters.

In some alternative and/or additional aspects, the gNB may dynamically indicate which type of action time to use for SPS/CG parameter update in DCI, MAC-CE, or RRC signaling.

Figure 5:
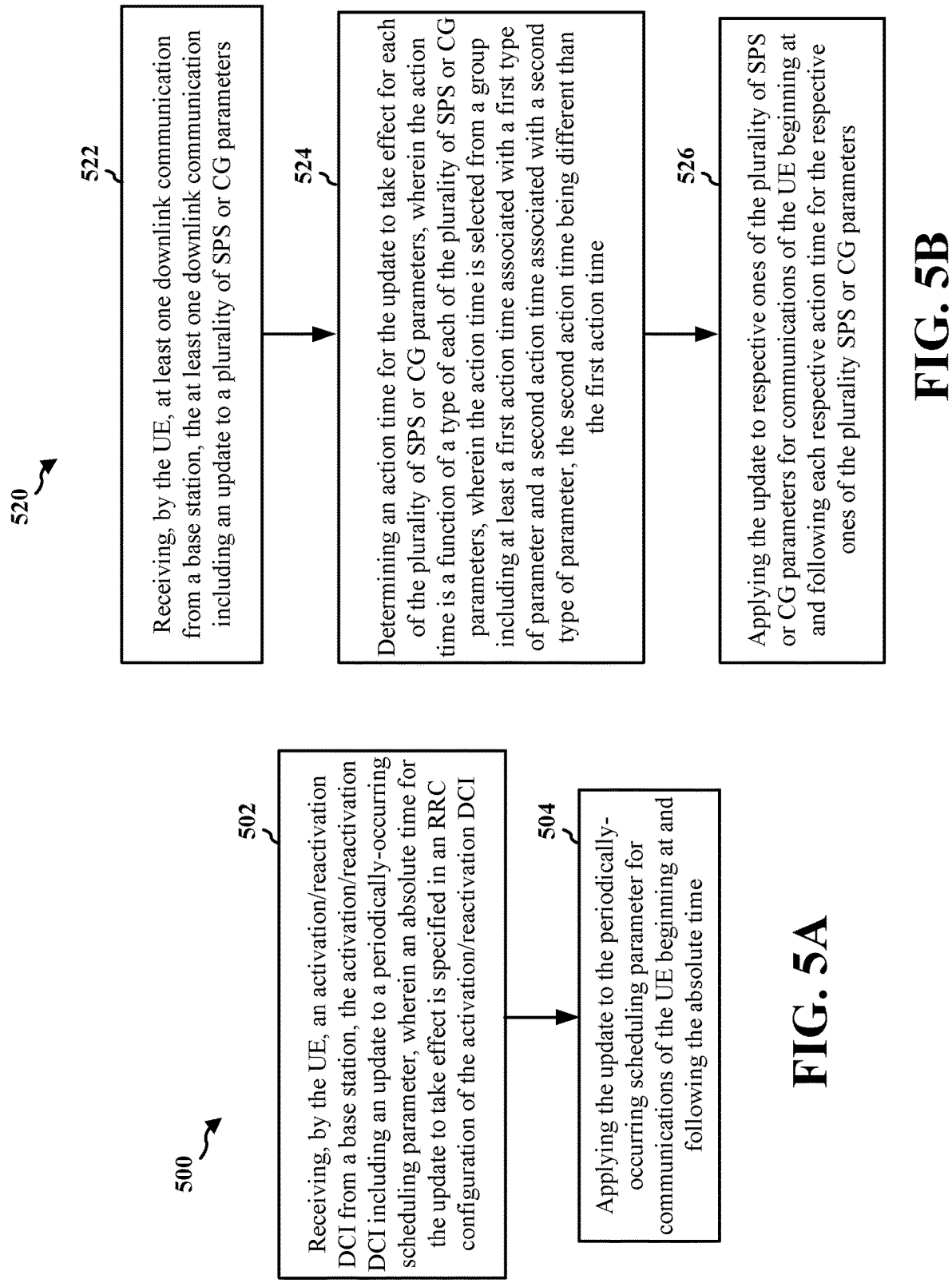
FIG. 5A is a flow chart illustrating a first example method at a UE for SPS functionality, in accordance with various aspects of the present disclosure.
FIG. 5B is a flow chart illustrating a second example method at a UE for SPS functionality, in accordance with various aspects of the present disclosure.

FIGS. 5A and 5B illustrate flow charts of example methods 500 and 520 for wireless communications for a UE. In an example, UE 104 may perform the functions described in any of methods 500 or 520 using one or more of the components described in FIG. 1 above (e.g., modem 140 and/or SPS component 142) or in FIG. 7 or 9 below (e.g., the antenna 765, RF front end 788, transceiver 702, modem 140, processor 712, memory 716, and/or SPS component 142 in FIG. 7).

Referring to FIG. 5A, at 502, the method 500 of wireless communication for a UE includes receiving, by the UE, an activation/reactivation DCI from a base station, the activation/reactivation DCI including an update to a periodically-occurring scheduling, where an absolute time for the update to take effect is specified in an RRC configuration of the activation/reactivation DCI. For example, in an aspect, the UE 104, the antenna 765, RF front end 788, transceiver 702, modem 140, processor 712, memory 716, and/or SPS component 142 may receive an activation/reactivation DCI from the base station 102, the activation/reactivation DCI including an update to a periodically-occurring scheduling, where an absolute time for the update to take effect is specified in an RRC configuration of the activation/reactivation DCI, as described herein. In an aspect, for example, the periodically-occurring scheduling may relate to longer time scale allocations repeated periodically in time, such as SPS or CG. In an aspect, for example, the DCI may be carried by a wireless signal that is received and processed by the UE 104, and the DCI indicates an absolute time for the update to take effect, as describe herein. For example, in an aspect, the DCI may indicate an absolute time for the SPS or CG parameter update to take effect, where the absolute time is common to a group of UEs 105 served by the base station 102 and including the UE 104. Accordingly, in an aspect, the UE 104, the antenna 765, RF front end 788, transceiver 702, modem 140, processor 712, memory 716, and/or SPS component 142 may provide means for receiving, by the UE, an activation/reactivation DCI from a base station, the activation/reactivation DCI including an update to a periodically-occurring scheduling, where an absolute time for the update to take effect is specified in an RRC configuration of the activation/reactivation DCI.

At 504, the method 500 further includes applying the update to the periodically-occurring scheduling for communications of the UE beginning at and following the absolute time. For example, in an aspect, the UE 104, the antenna 765, RF front end 788, transceiver 702, modem 140, processor 712, memory 716, and/or SPS component 142 may apply the update to the periodically-occurring scheduling for communications of the UE 104 beginning at and following the absolute time, as described above. For instance, the UE 104 may determine the absolute time by decoding an indication in the downlink communication. In an aspect, for example, the update is applied to a persistent scheduling occurring periodically, such as a SPS or CG. Accordingly, in an aspect, the UE 104, the antenna 765, RF front end 788, transceiver 702, modem 140, processor 712, memory 716, and/or SPS component 142 may provide means for applying the update to the periodically-occurring scheduling for communications of the UE beginning at and following the absolute time.

Optionally or in addition, the periodically-occurring scheduling includes a SPS or CG parameter, the absolute time is common to a group of UEs 105 including the UE 104, and updates to one or more SPS or CG parameters of the group of UEs 105 take effect simultaneously at the absolute time.

Optionally or in addition, the absolute time is after an end of the activation/reactivation DCI.

Optionally or in addition, the absolute time is a next boundary within a set of periodic time boundaries.

Optionally or in addition, the absolute time is expressed in a frame index, a subframe index, a slot index, or a symbol index.

Referring to FIG. 5B, at 522, the method 520 of wireless communication for a UE includes receiving, by the UE, at least one downlink communication from a base station, the at least one downlink communication including an update to a plurality of SPS or CG parameters. For example, in an aspect, the UE 104, the antenna 765, RF front end 788, transceiver 702, modem 140, processor 712, memory 716, and/or SPS component 142 may receive at least one downlink communication from a base station 102, the at least one downlink communication including an update to a plurality of SPS or CG parameters, as described above. Accordingly, in an aspect, the UE 104, the antenna 765, RF front end 788, transceiver 702, modem 140, processor 712, memory 716, and/or SPS component 142 may provide means for receiving, by the UE, at least one downlink communication from a base station, the at least one downlink communication including an update to a plurality of SPS or CG parameters.

At 524, the method 520 further includes determining an action time for the update to take effect for each of the plurality of SPS or CG parameters, where the action time is a function of a type of each of the plurality of SPS or CG parameters, where the action time is selected from a group including at least a first action time associated with a first type of parameter and a second action time associated with a second type of parameter, the second action time being different than the first action time. For example, in an aspect, the UE 104, the antenna 765, RF front end 788, transceiver 702, modem 140, processor 712, memory 716, and/or SPS component 142 may determine an action time for the update to take effect for each of the plurality of SPS or CG parameters, where the action time is a function of a type of each of the plurality of SPS or CG parameters, where the action time is selected from a group including at least a first action time associated with a first type of parameter and a second action time associated with a second type of parameter, the second action time being different than the first action time, as described above. Accordingly, in an aspect, the UE 104, the antenna 765, RF front end 788, transceiver 702, modem 140, processor 712, memory 716, and/or SPS component 142 may provide means for determining an action time for the update to take effect for each of the plurality of SPS or CG parameters, where the action time is a function of a type of each of the plurality of SPS or CG parameters, where the action time is selected from a group including at least a first action time associated with a first type of parameter and a second action time associated with a second type of parameter, the second action time being different than the first action time.

At 526, the method 520 further includes applying the update to respective ones of the plurality of SPS or CG parameters for communications of the UE beginning at and following each respective action time for the respective ones of the plurality SPS or CG parameters. For example, in an aspect, the UE 104, the antenna 765, RF front end 788, transceiver 702, modem 140, processor 712, memory 716, and/or SPS component 142 may apply the update to respective ones of the plurality of SPS or CG parameters for communications of the UE 104 beginning at and following each respective action time for the respective ones of the plurality SPS or CG parameters, as described above. Accordingly, in an aspect, the UE 104, the antenna 765, RF front end 788, transceiver 702, modem 140, processor 712, memory 716, and/or SPS component 142 may provide means for applying the update to respective ones of the plurality of SPS or CG parameters for communications of the UE beginning at and following each respective action time for the respective ones of the plurality SPS or CG parameters.

Optionally or in addition, the first action time is a first periodic time boundary after the downlink communication and the second action time is a second periodic time boundary after the downlink communication, the first periodic time boundary being different than the second periodic time boundary.

Optionally or in addition, each action time is specified in the downlink communication.

Optionally or in addition, receiving the at least one downlink communication includes receiving at least one of an activation/reactivation DCI or a MAC CE or an RRC signaling that includes each action time that updates the plurality of SPS or CG parameters. For example, in an aspect, the UE 104, the antenna 765, RF front end 788, transceiver 702, modem 140, processor 712, memory 716, and/or SPS component 142 may receive at least one of an activation/reactivation DCI or a MAC CE or an RRC signaling that includes each action time that updates the plurality of SPS or CG parameters, as described herein.

Optionally or in addition, the at least one downlink communication includes an activation/reactivation DCI indicating an updated scheduling offset.

Optionally or in addition, the method 522 further includes applying the updated scheduling offset for the communications of the UE beginning at and following the first action time, where the first action time coincides with an end of a transmission of the activation/reactivation DCI. For example, in an aspect, the UE 104, the antenna 765, RF front end 788, transceiver 702, modem 140, processor 712, memory 716, and/or SPS component 142 may apply the updated scheduling offset for the communications of the UE beginning at and following the first action time, where the first action time coincides with an end of a transmission of the activation/reactivation DCI, as described herein.

Optionally or in addition, the activation/reactivation DCI further indicates an updated non-scheduling parameter.

Optionally or in addition, the method 522 further includes applying the updated non-scheduling parameter for the communications of the UE beginning at and following the second action time, where the second action time coincides with an amount of time after the end of the transmission of the activation/reactivation DCI. For example, in an aspect, the UE 104, the antenna 765, RF front end 788, transceiver 702, modem 140, processor 712, memory 716, and/or SPS component 142 may apply the updated non-scheduling parameter for the communications of the UE 104 beginning at and following the second action time, where the second action time coincides with an amount of time after the end of the transmission of the activation/reactivation DCI, as described herein.

Optionally or in addition, the communications of the UE 104 include a PDSCH or a PUSCH, and the updated scheduling offset includes a K0 or a K2.

Optionally or in addition, the second action time is specified as a K0 or a K2 plus a time delay.

Optionally or in addition, the method 522 further includes identifying a transient period that starts with the activation/reactivation DCI and ends with a first updated scheduled transmission according to the updated scheduling parameter indicated in the activation/reactivation DCI. For example, in an aspect, the UE 104, the antenna 765, RF front end 788, transceiver 702, modem 140, processor 712, memory 716, and/or SPS component 142 may identify a transient period that starts with the activation/reactivation DCI and ends with a first updated scheduled transmission according to the updated scheduling parameter indicated in the activation/reactivation DCI, as described herein.

Optionally or in addition, the method 522 further includes skipping communication of scheduled transmissions that are according to a previous SPS or CG configuration in the transient period. For example, in an aspect, the UE 104, the antenna 765, RF front end 788, transceiver 702, modem 140, processor 712, memory 716, and/or SPS component 142 may skip communication of scheduled transmissions that are according to a previous SPS or CG configuration in the transient period, as described herein.

Optionally or in addition, the method 522 further includes determining whether to allow communication of a scheduled transmission that is according to a previous SPS or CG configuration in the transient period. For example, in an aspect, the UE 104, the antenna 765, RF front end 788, transceiver 702, modem 140, processor 712, memory 716, and/or SPS component 142 may determine whether to allow communication of a scheduled transmission that is according to a previous SPS or CG configuration in the transient period, as described herein.

Optionally or in addition, the determining whether to allow the communication of the scheduled transmission includes skipping the communication of the scheduled communication in response to the scheduled communication including a PDSCH with an uplink feedback resource that is after the first updated scheduled transmission; and allowing the communication of the scheduled communication otherwise. For example, in an aspect, the UE 104, the antenna 765, RF front end 788, transceiver 702, modem 140, processor 712, memory 716, and/or SPS component 142 may skip the communication of the scheduled communication in response to the scheduled communication including a PDSCH with an uplink feedback resource that is after the first updated scheduled transmission, and allow the communication of the scheduled communication otherwise, as described herein.

Optionally or in addition, the determining whether to allow the communication of the scheduled transmission includes skipping the communication of the scheduled communication in response to the scheduled communication including a PDSCH with a same HARQ ID as the first updated scheduled transmission and an uplink feedback resource that is after the first updated scheduled transmission, and allowing communication of the scheduled communication otherwise. For example, in an aspect, the UE 104, the antenna 765, RF front end 788, transceiver 702, modem 140, processor 712, memory 716, and/or SPS component 142 may skip the communication of the scheduled communication in response to the scheduled communication including a PDSCH with a same HARQ ID as the first updated scheduled transmission and an uplink feedback resource that is after the first updated scheduled transmission, and allow communication of the scheduled communication otherwise, as described herein.

Optionally or in addition, the determining whether to allow the communication of the scheduled transmission includes skipping the communication of the scheduled communication in response to the scheduled communication overlapping with the first updated scheduled transmission, and allowing the communication of the scheduled communication otherwise. For example, in an aspect, the UE 104, the antenna 765, RF front end 788, transceiver 702, modem 140, processor 712, memory 716, and/or SPS component 142 may skip the communication of the scheduled communication in response to the scheduled communication overlapping with the first updated scheduled transmission, and allow the communication of the scheduled communication otherwise, as described herein.

Figure 6:
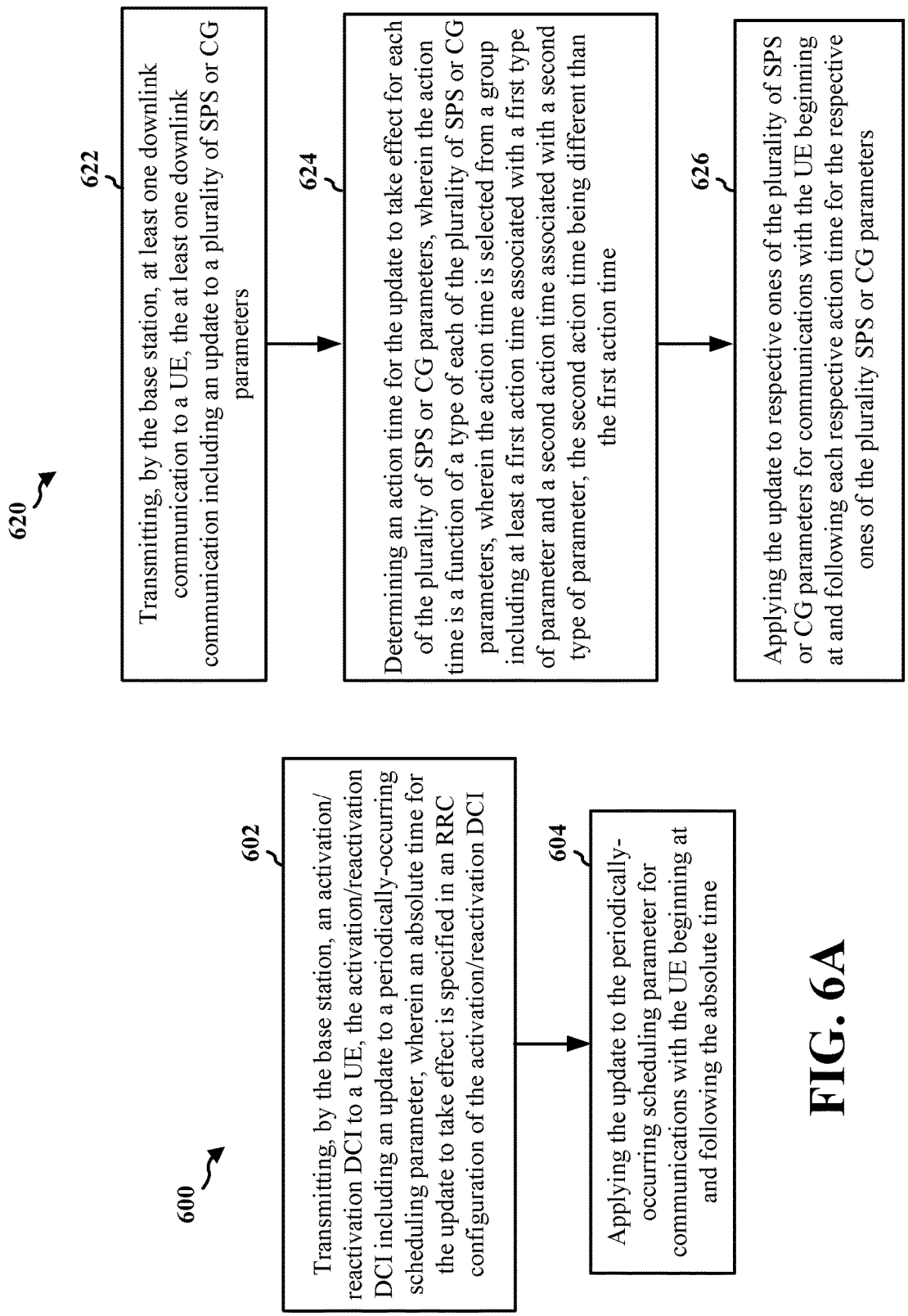
FIG. 6A is a flow chart illustrating a first example method at a base station for SPS functionality, in accordance with various aspects of the present disclosure.
FIG. 6B is a flow chart illustrating a second example method at a base station for SPS functionality, in accordance with various aspects of the present disclosure.

FIGS. 6A and 6B illustrate flow charts of example methods 600 and 620 for wireless communications for a base station. In an example, the base station 102 may perform the functions described in any of methods 600 or 620 using one or more of the components described in FIG. 1 (e.g., SPS component 143) above or in FIG. 8 or 9 below (e.g., the antenna 865, RF front end 888, transceiver 802, modem 141, processor 812, memory 816, and/or SPS component 143 in FIG. 8).

Referring to FIG. 6A, at 602, the method 600 of wireless communication for a base station includes transmitting, by the base station, an activation/reactivation DCI to a UE, the activation/reactivation DCI including an update to a periodically-occurring scheduling, where an absolute time for the update to take effect is specified in an RRC configuration of the activation/reactivation DCI. For example, in an aspect, the base station 102, the antenna 865, RF front end 888, transceiver 802, modem 141, processor 812, memory 816, and/or SPS component 143 may transmit an activation/reactivation DCI to the UE 104, the activation/reactivation DCI including an update to a periodically-occurring scheduling, where an absolute time for the update to take effect is specified in an RRC configuration of the activation/reactivation DCI, as described herein. In an aspect, for example, the periodically-occurring scheduling may relate to longer time scale allocations repeated periodically in time, such as SPS or CG. In an aspect, for example, the DCI may be carried by a wireless signal that is received and processed by the UE 104, and the DCI indicates an absolute time for the update to take effect, as describe herein. For example, in an aspect, the DCI may indicate an absolute time for the SPS or CG parameter update to take effect, where the absolute time is common to a group of UEs 105 served by the base station 102 and including the UE 104. Accordingly, in an aspect, the base station 102, the antenna 865, RF front end 888, transceiver 802, modem 141, processor 812, memory 816, and/or SPS component 143 may provide means for transmitting an activation/reactivation DCI to the UE 104, the activation/reactivation DCI including an update to a periodically-occurring scheduling, where an absolute time for the update to take effect is specified in an RRC configuration of the activation/reactivation DCI.

At 604, the method 600 further includes applying the update to the periodically-occurring scheduling for communications with the UE beginning at and following the absolute time. For example, in an aspect, the base station 102, the antenna 865, RF front end 888, transceiver 802, modem 141, processor 812, memory 816, and/or SPS component 143 may apply the update to the periodically-occurring scheduling for communications with the UE 104 beginning at and following the absolute time, as described above. In an aspect, for example, the update is applied to a persistent scheduling occurring periodically, such as a SPS or CG. Accordingly, in an aspect, the base station 102, the antenna 865, RF front end 888, transceiver 802, modem 141, processor 812, memory 816, and/or SPS component 143 may provide means for applying the update to the periodically-occurring scheduling for communications with the UE 104 beginning at and following the absolute time.

Optionally or in addition, the periodically-occurring scheduling include a SPS or CG parameter, the absolute time is common to a group of UEs 105 including the UE 104, and updates to one or more SPS or CG parameters of the group of UEs 105 take effect simultaneously at the absolute time.

Optionally or in addition, the absolute time is after an end of the activation/reactivation DCI.

Optionally or in addition, the absolute time is a next boundary within a set of periodic time boundaries.

Optionally or in addition, the absolute time is expressed in a frame index, a subframe index, a slot index, or a symbol index.

Referring to FIG. 6B, at 622, the method 620 of wireless communication for a base station includes transmitting, by the base station, at least one downlink communication to a UE, the at least one downlink communication including an update to a plurality of SPS or CG parameters. For example, in an aspect, the base station 102, the antenna 865, RF front end 888, transceiver 802, modem 141, processor 812, memory 816, and/or SPS component 143 may transmit at least one downlink communication to a UE 104, the at least one downlink communication including an update to a plurality of SPS or CG parameters, as described above. Accordingly, in an aspect, the base station 102, the antenna 865, RF front end 888, transceiver 802, modem 141, processor 812, memory 816, and/or SPS component 143 may provide means for transmitting at least one downlink communication to a UE 104, the at least one downlink communication including an update to a plurality of SPS or CG parameters.

At 624, the method 620 further includes determining an action time for the update to take effect for each of the plurality of SPS or CG parameters, where the action time is a function of a type of each of the plurality of SPS or CG parameters, where the action time is selected from a group including at least a first action time associated with a first type of parameter and a second action time associated with a second type of parameter, the second action time being different than the first action time. For example, in an aspect, the base station 102, the antenna 865, RF front end 888, transceiver 802, modem 141, processor 812, memory 816, and/or SPS component 143 may determine an action time for the update to take effect for each of the plurality of SPS or CG parameters, where the action time is a function of a type of each of the plurality of SPS or CG parameters, where the action time is selected from a group including at least a first action time associated with a first type of parameter and a second action time associated with a second type of parameter, the second action time being different than the first action time, as described above. Accordingly, in an aspect, the base station 102, the antenna 865, RF front end 888, transceiver 802, modem 141, processor 812, memory 816, and/or SPS component 143 may provide means for determining an action time for the update to take effect for each of the plurality of SPS or CG parameters, where the action time is a function of a type of each of the plurality of SPS or CG parameters, where the action time is selected from a group including at least a first action time associated with a first type of parameter and a second action time associated with a second type of parameter, the second action time being different than the first action time.

At 626, the method 620 further includes applying the update to respective ones of the plurality of SPS or CG parameters for communications with the UE beginning at and following each respective action time for the respective ones of the plurality SPS or CG parameters. For example, in an aspect, the base station 102, the antenna 865, RF front end 888, transceiver 802, modem 141, processor 812, memory 816, and/or SPS component 143 may apply the update to respective ones of the plurality of SPS or CG parameters for communications with the UE 104 beginning at and following each respective action time for the respective ones of the plurality SPS or CG parameters, as described above. Accordingly, in an aspect, the base station 102, the antenna 865, RF front end 888, transceiver 802, modem 141, processor 812, memory 816, and/or SPS component 143 may provide means for applying the update to respective ones of the plurality of SPS or CG parameters for communications with the UE 104 beginning at and following each respective action time for the respective ones of the plurality SPS or CG parameters.

Optionally or in addition, the first action time is a first periodic time boundary after the downlink communication and the second action time is a second periodic time boundary after the downlink communication, the first periodic time boundary being different than the second periodic time boundary.

Optionally or in addition, each action time is specified in the downlink communication.

Optionally or in addition, transmitting the at least one downlink communication includes transmitting at least one of an activation/reactivation DCI or a MAC CE or an RRC signaling that includes each action time that updates the plurality of SPS or CG parameters. For example, in an aspect, the base station 102, the antenna 865, RF front end 888, transceiver 802, modem 141, processor 812, memory 816, and/or SPS component 143 may transmit at least one of an activation/reactivation DCI or a MAC CE or an RRC signaling that includes each action time that updates the plurality of SPS or CG parameters, as described herein.

Optionally or in addition, the at least one downlink communication includes an activation/reactivation DCI indicating an updated scheduling offset.

Optionally or in addition, the method 622 further includes applying the updated scheduling offset for the communications with the UE beginning at and following the first action time, where the first action time coincides with an end of a transmission of the activation/reactivation DCI. For example, in an aspect, the base station 102, the antenna 865, RF front end 888, transceiver 802, modem 141, processor 812, memory 816, and/or SPS component 143 may apply the updated scheduling offset for the communications with the UE 104 beginning at and following the first action time, where the first action time coincides with an end of a transmission of the activation/reactivation DCI, as described herein.

Optionally or in addition, the activation/reactivation DCI further indicates an updated non-scheduling parameter.

Optionally or in addition, the method 622 further includes applying the updated non-scheduling parameter for the communications with the UE beginning at and following the second action time, where the second action time coincides with an amount of time after the end of the transmission of the activation/reactivation DCI. For example, in an aspect, the base station 102, the antenna 865, RF front end 888, transceiver 802, modem 141, processor 812, memory 816, and/or SPS component 143 may apply the updated non-scheduling parameter for the communications with the UE 104 beginning at and following the second action time, where the second action time coincides with an amount of time after the end of the transmission of the activation/reactivation DCI, as described herein.

Optionally or in addition, the communications with the UE 104 include a PDSCH or a PUSCH, and the updated scheduling offset includes a K0 or a K2.

Optionally or in addition, the second action time is specified as a K0 or a K2 plus a time delay.

Optionally or in addition, the method 622 further includes identifying a transient period that starts with the activation/reactivation DCI and ends with a first updated scheduled transmission according to the updated scheduling parameter indicated in the activation/reactivation DCI. For example, in an aspect, the base station 102, the antenna 865, RF front end 888, transceiver 802, modem 141, processor 812, memory 816, and/or SPS component 143 may identify a transient period that starts with the activation/reactivation DCI and ends with a first updated scheduled transmission according to the updated scheduling parameter indicated in the activation/reactivation DCI, as described herein.

Optionally or in addition, the method 622 further includes skipping communication of scheduled transmissions that are according to a previous SPS or CG configuration in the transient period. For example, in an aspect, the base station 102, the antenna 865, RF front end 888, transceiver 802, modem 141, processor 812, memory 816, and/or SPS component 143 may skip communication of scheduled transmissions that are according to a previous SPS or CG configuration in the transient period, as described herein.

Optionally or in addition, the method 622 further includes determining whether to allow communication of a scheduled transmission that is according to a previous SPS or CG configuration in the transient period. For example, in an aspect, the base station 102, the antenna 865, RF front end 888, transceiver 802, modem 141, processor 812, memory 816, and/or SPS component 143 may determine whether to allow communication of a scheduled transmission that is according to a previous SPS or CG configuration in the transient period, as described herein.

Optionally or in addition, the determining whether to allow the communication of the scheduled transmission includes skipping the communication of the scheduled communication in response to the scheduled communication including a PDSCH with an uplink feedback resource that is after the first updated scheduled transmission; and allowing the communication of the scheduled communication otherwise. For example, in an aspect, the base station 102, the antenna 865, RF front end 888, transceiver 802, modem 141, processor 812, memory 816, and/or SPS component 143 may skip the communication of the scheduled communication in response to the scheduled communication including a PDSCH with an uplink feedback resource that is after the first updated scheduled transmission; and allow the communication of the scheduled communication otherwise, as described herein.

Optionally or in addition, the determining whether to allow the communication of the scheduled transmission includes skipping the communication of the scheduled communication in response to the scheduled communication including a PDSCH with a same HARQ ID as the first updated scheduled transmission and an uplink feedback resource that is after the first updated scheduled transmission, and allowing communication of the scheduled communication otherwise. For example, in an aspect, the base station 102, the antenna 865, RF front end 888, transceiver 802, modem 141, processor 812, memory 816, and/or SPS component 143 may skip the communication of the scheduled communication in response to the scheduled communication including a PDSCH with a same HARQ ID as the first updated scheduled transmission and an uplink feedback resource that is after the first updated scheduled transmission, and allow communication of the scheduled communication otherwise, as described herein.

Optionally or in addition, the determining whether to allow the communication of the scheduled transmission includes skipping the communication of the scheduled communication in response to the scheduled communication overlapping with the first updated scheduled transmission, and allowing the communication of the scheduled communication otherwise. For example, in an aspect, the base station 102, the antenna 865, RF front end 888, transceiver 802, modem 141, processor 812, memory 816, and/or SPS component 143 may skip the communication of the scheduled communication in response to the scheduled communication overlapping with the first updated scheduled transmission, and allow the communication of the scheduled communication otherwise, as described herein.

Figure 7:
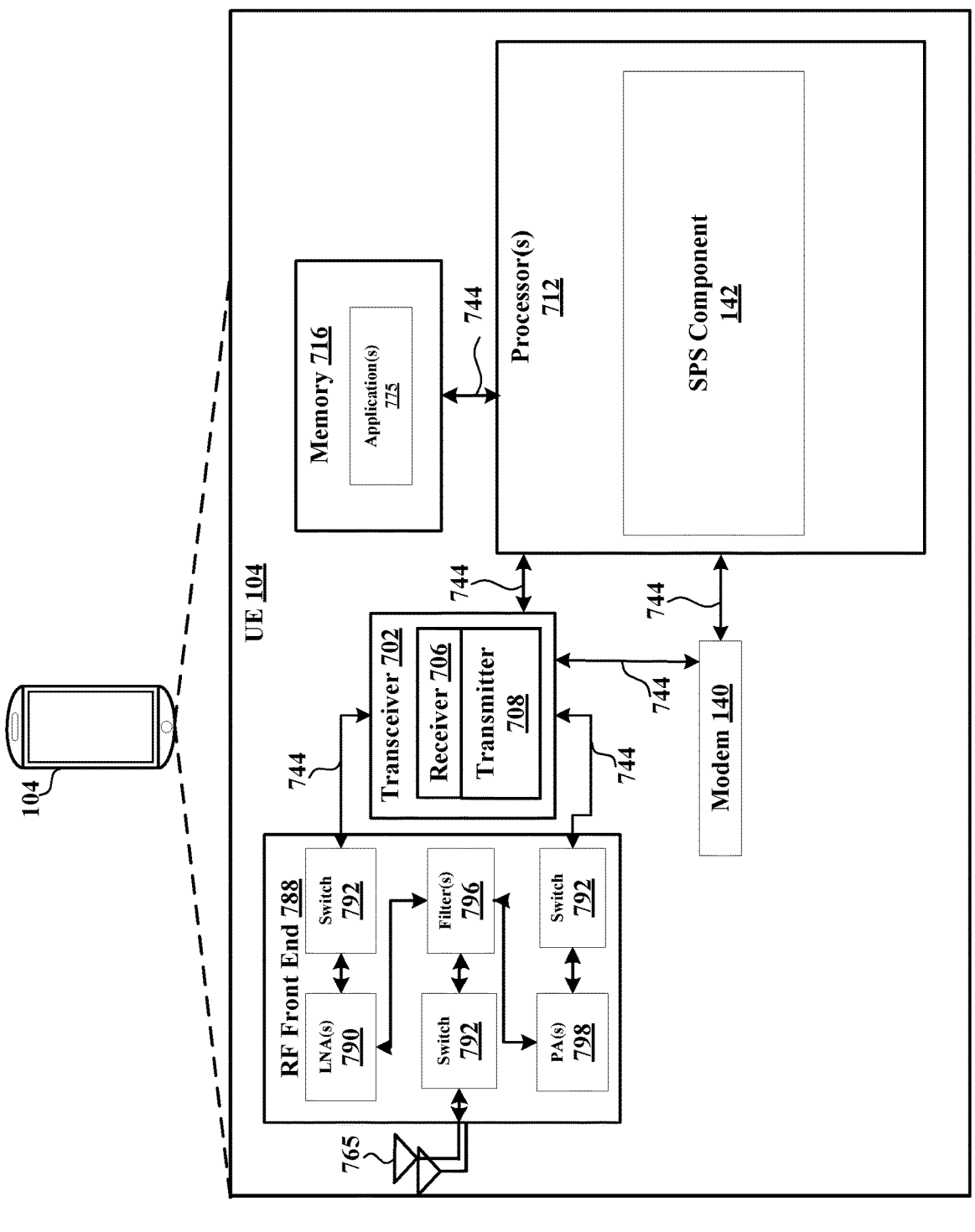
FIG. 7 is a block diagram illustrating example components of an example UE, in accordance with various aspects of the present disclosure.

Referring to FIG. 7, one example of an implementation of UE 104 may include a variety of components, some of which have already been described above and are described further herein, including components such as one or more processors 712 and memory 716 and transceiver 702 in communication via one or more buses 744, which may operate in conjunction with modem 140 and/or SPS component 142 to enable one or more of the functions described herein related to SPS.

In an aspect, the one or more processors 712 can include a modem 140 and/or can be part of the modem 140 that uses one or more modem processors. Thus, the various functions related to SPS component 142 may be included in modem 140 and/or processors 712 and, in an aspect, can be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 140 associated with SPS component 142 may be performed by transceiver 702.

Also, memory 716 may be configured to store data used herein and/or local versions of applications 775 or SPS component 142 and/or one or more of its subcomponents being executed by at least one processor 712. Memory 716 can include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, memory 716 may be a non-transitory computer-readable storage medium that stores one or more computer-executable codes defining SPS component 142 and/or one or more of its subcomponents, and/or data associated therewith, when UE 104 is operating at least one processor 712 to execute SPS component 142 and/or one or more of its subcomponents.

Transceiver 702 may include at least one receiver 706 and at least one transmitter 708. Receiver 706 may include hardware, firmware, and/or software code executable by a processor for receiving data, the code including instructions and being stored in a memory (e.g., computer-readable medium). Receiver 706 may be, for example, a radio frequency (RF) receiver. In an aspect, receiver 706 may receive signals transmitted by at least one base station 102. Additionally, receiver 706 may process such received signals, and also may obtain measurements of the signals, such as, but not limited to, Ec/Io, signal-to-noise ratio (SNR), reference signal received power (RSRP), received signal strength indicator (RSSI), etc. Transmitter 708 may include hardware, firmware, and/or software code executable by a processor for transmitting data, the code including instructions and being stored in a memory (e.g., computer-readable medium). A suitable example of transmitter 708 may including, but is not limited to, an RF transmitter.

Moreover, in an aspect, UE 104 may include RF front end 788, which may operate in communication with one or more antennas 765 and transceiver 702 for receiving and transmitting radio transmissions, for example, wireless communications transmitted by at least one base station 102 or wireless transmissions transmitted by UE 104. RF front end 788 may be connected to one or more antennas 765 and can include one or more low-noise amplifiers (LNAs) 790, one or more switches 792, one or more power amplifiers (PAs) 798, and one or more filters 796 for transmitting and receiving RF signals.

In an aspect, LNA 790 can amplify a received signal at a desired output level. In an aspect, each LNA 790 may have a specified minimum and maximum gain values. In an aspect, RF front end 788 may use one or more switches 792 to select a particular LNA 790 and its specified gain value based on a desired gain value for a particular application.

Further, for example, one or more PA(s) 798 may be used by RF front end 788 to amplify a signal for an RF output at a desired output power level. In an aspect, each PA 798 may have specified minimum and maximum gain values. In an aspect, RF front end 788 may use one or more switches 792 to select a particular PA 798 and its specified gain value based on a desired gain value for a particular application.

Also, for example, one or more filters 796 can be used by RF front end 788 to filter a received signal to obtain an input RF signal. Similarly, in an aspect, for example, a respective filter 796 can be used to filter an output from a respective PA 798 to produce an output signal for transmission. In an aspect, each filter 796 can be connected to a specific LNA 790 and/or PA 798. In an aspect, RF front end 788 can use one or more switches 792 to select a transmit or receive path using a specified filter 796, LNA 790, and/or PA 798, based on a configuration as specified by transceiver 702 and/or processor 712.

As such, transceiver 702 may be configured to transmit and receive wireless signals through one or more antennas 765 via RF front end 788. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 702 to operate at a specified frequency and power level based on the UE configuration of the UE 104 and the communication protocol used by modem 140.

In an aspect, modem 140 can be a multiband-multimode modem, which can process digital data and communicate with transceiver 702 such that the digital data is sent and received using transceiver 702. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 788, transceiver 702) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Although illustrated as being associated with the processor 712, it should be understood that the functionality of the SPS component 142 may alternatively be implemented by the modem 140.

In an aspect, the processor(s) 712 may correspond to one or more of the processors described in connection with UE 950 in FIG. 9 below. Similarly, the memory 716 may correspond to the memory described in connection with UE 950 in FIG. 9 below.

In one configuration, UE 104 or UE 950 (FIG. 9) may be an apparatus for wireless communication including means for performing any of the appended claims for wireless communication by a UE. The aforementioned means may be one or more of the aforementioned components of UE 104 and/or processor 712 of UE 104 configured to perform the functions recited by the aforementioned means. As described supra, processor 712 may include the TX Processor 968, the RX Processor 956, and the controller/processor 959 of UE 950 described below with reference to FIG. 9. As such, in one configuration, the aforementioned means may be the TX Processor 968, the RX Processor 956, and the controller/processor 959 configured to perform the functions recited by the aforementioned means.

Figure 8:
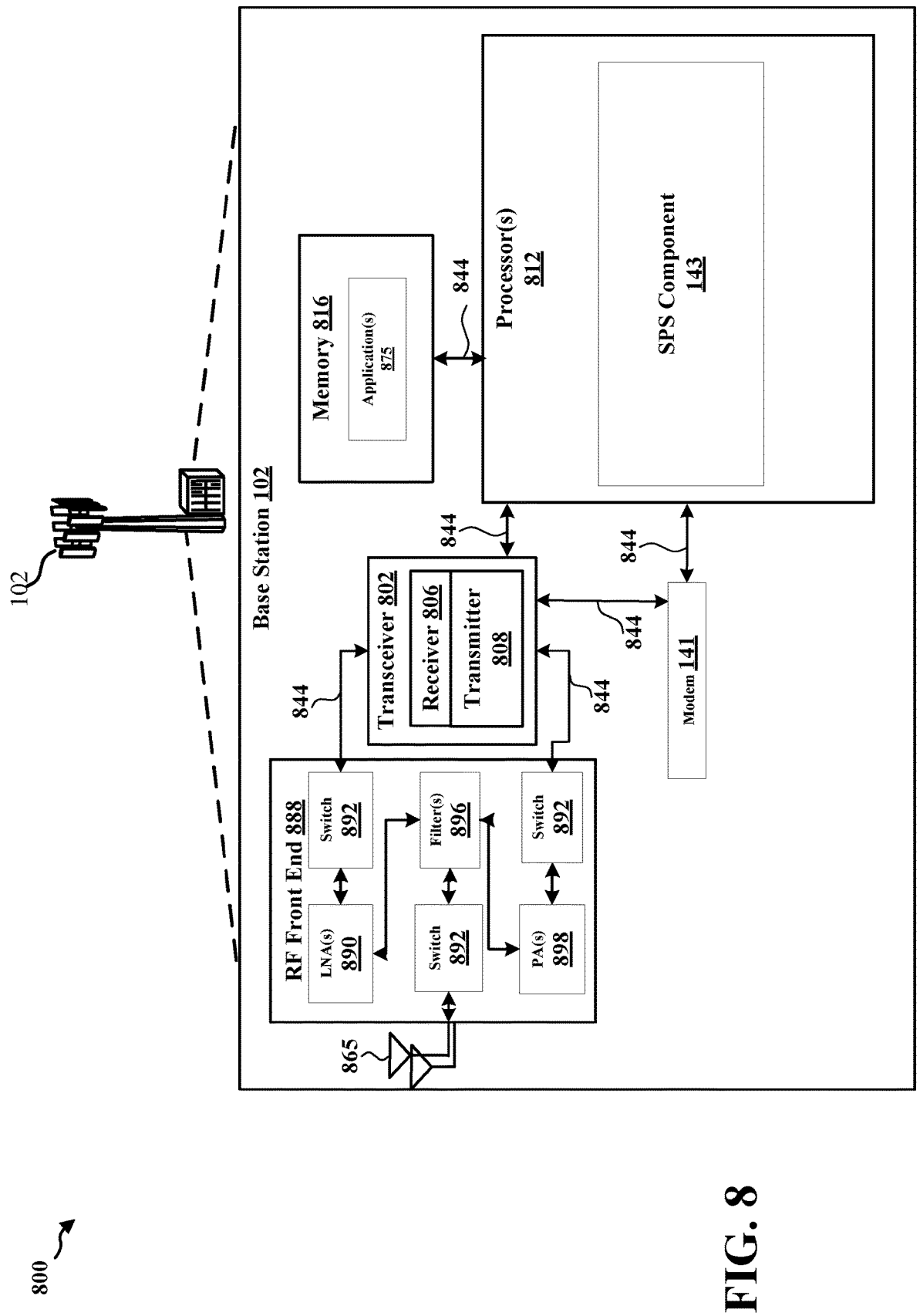
FIG. 8 is a block diagram illustrating example components of an example base station, in accordance with various aspects of the present disclosure.

Referring to FIG. 8, one example of an implementation of base station 102 may include a variety of components, some of which have already been described above and are described further herein, including components such as one or more processors 812 and memory 816 and transceiver 802 in communication via one or more buses 844, which may operate in conjunction with modem 141 and/or SPS component 143 to enable one or more of the functions described herein related to SPS.

In an aspect, the one or more processors 812 can include a modem 141 and/or can be part of the modem 141 that uses one or more modem processors. Thus, the various functions related to SPS component 143 may be included in modem 141 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 141 associated with SPS component 143 may be performed by transceiver 802.

Also, memory 816 may be configured to store data used herein and/or local versions of applications 875 or SPS component 143 and/or one or more of its subcomponents being executed by at least one processor 812. Memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining SPS component 143 and/or one or more of its subcomponents, and/or data associated therewith, when base station 102 is operating at least one processor 812 to execute SPS component 143 and/or one or more of its subcomponents.

Transceiver 802 may include at least one receiver 806 and at least one transmitter 808. Receiver 806 may include hardware, firmware, and/or software code executable by a processor for receiving data, the code including instructions and being stored in a memory (e.g., computer-readable medium). Receiver 806 may be, for example, a radio frequency (RF) receiver. In an aspect, receiver 806 may receive signals transmitted by at least one UE 104. Additionally, receiver 806 may process such received signals, and also may obtain measurements of the signals, such as, but not limited to, Ec/Io, signal-to-noise ratio (SNR), reference signal received power (RSRP), received signal strength indicator (RSSI), etc. Transmitter 808 may include hardware, firmware, and/or software code executable by a processor for transmitting data, the code including instructions and being stored in a memory (e.g., computer-readable medium). A suitable example of transmitter 808 may including, but is not limited to, an RF transmitter.

Moreover, in an aspect, base station 102 may include RF front end 888, which may operate in communication with one or more antennas 865 and transceiver 802 for receiving and transmitting radio transmissions, for example, wireless communications transmitted by other base stations 102 or wireless transmissions transmitted by UE 104. RF front end 888 may be connected to one or more antennas 865 and can include one or more low-noise amplifiers (LNAs) 890, one or more switches 892, one or more power amplifiers (PAs) 898, and one or more filters 896 for transmitting and receiving RF signals.

In an aspect, LNA 890 can amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 can be used by RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, RF front end 888 can use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver may be tuned to operate at specified frequencies such that base station 102 can communicate with, for example, one or more UEs 104 or one or more cells associated with one or more other base stations 102. In an aspect, for example, modem 141 can configure transceiver 802 to operate at a specified frequency and power level based on the base station configuration of the base station 102 and the communication protocol used by modem 141.

In an aspect, modem 141 can be a multiband-multimode modem, which can process digital data and communicate with transceiver 802 such that the digital data is sent and received using transceiver 802. In an aspect, modem 141 can be multiband and be configured to support multiple frequency bands for a specific communications protocol. In an aspect, modem 141 can be multimode and be configured to support multiple operating networks and communications protocols. In an aspect, modem 141 can control one or more components of base station 102 (e.g., RF front end 888, transceiver 802) to enable transmission and/or reception of signals from the network based on a specified modem configuration. In an aspect, the modem configuration can be based on the mode of the modem and the frequency band in use. In another aspect, the modem configuration can be based on base station configuration information associated with base station 102.

Although illustrated as being associated with the processor 812, it should be understood that the functionality of the SPS component 143 may alternatively be implemented by the modem 141.

In an aspect, the processor(s) 812 may correspond to one or more of the processors described in connection with base station 910 in FIG. 9 below. Similarly, the memory 816 may correspond to the memory described in connection with base station 910 in FIG. 9 below.

In one configuration, base station 102 or base station 910 may be an apparatus for wireless communication including means for performing any of the appended claims for wireless communication by a base station. The aforementioned means may be one or more of the aforementioned components of base station 102 and/or processor 812 of base station 102 configured to perform the functions recited by the aforementioned means. As described supra, processor 812 may include the TX Processor 916, the RX Processor 970, and the controller/processor 975 of base station 910 described below with reference to FIG. 9. As such, in one configuration, the aforementioned means may be the TX Processor 916, the RX Processor 970, and the controller/processor 975 configured to perform the functions recited by the aforementioned means.

Figure 9:
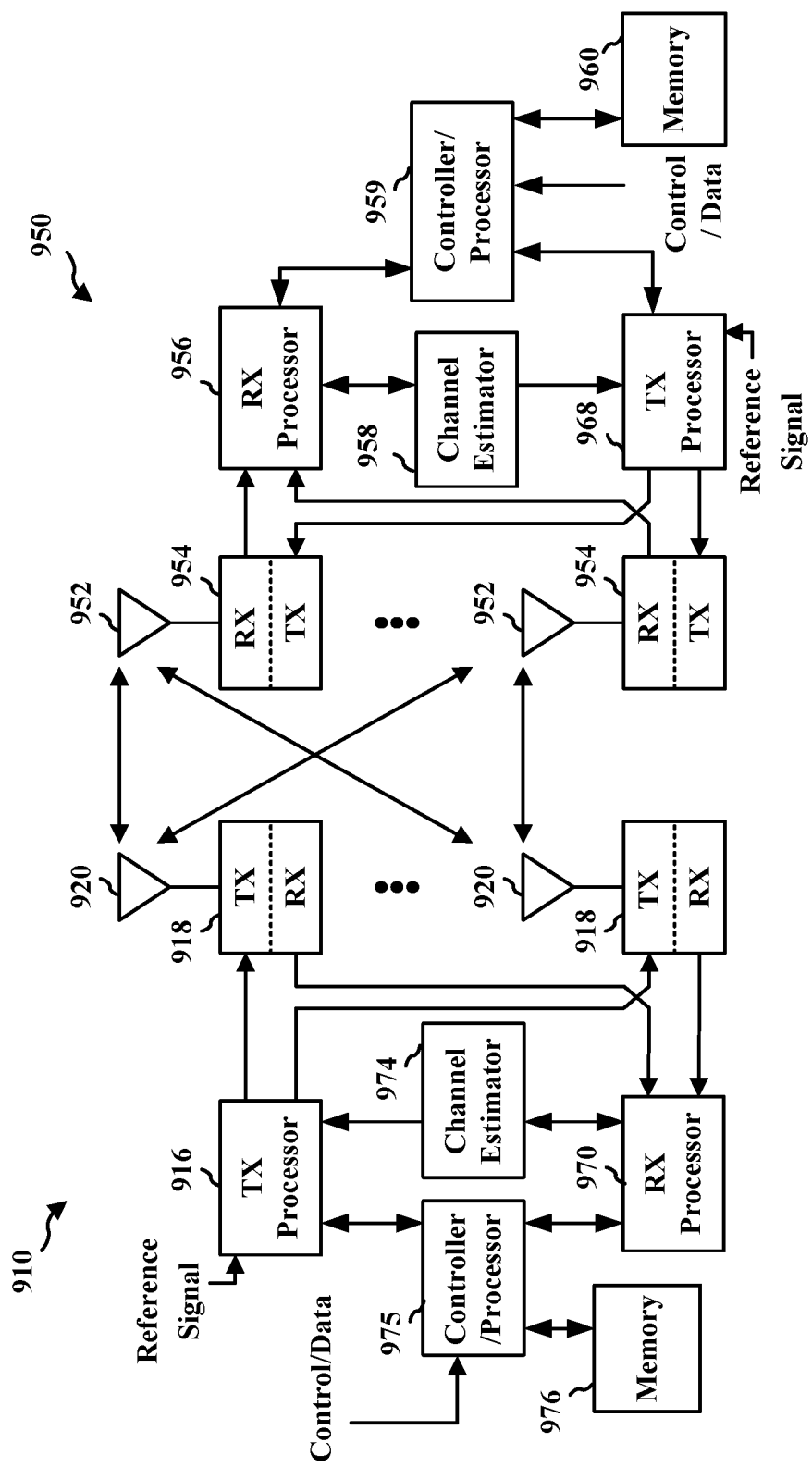
FIG. 9 is a diagram illustrating example components of a base station and a UE in an access network, in accordance with various aspects of the present disclosure.

FIG. 9 is a block diagram of a base station 910 in communication with a UE 950 in an access network.

In an aspect, one or more components of base station 910 may implement applications 875, modem 141, and/or SPS component 143 described above with reference to FIG. 8. For example, in an aspect, one or more processors of base station 910 (e.g., TX processor 916, RX processor 970, controller/processor 975, etc.) can include the modem 141 and/or can be part of modem 141 that uses one or more modem processors. In an aspect, the various functions related to SPS component 143 may be included in modem 141 and/or one or more processors of base station 910 and, in an aspect, can be executed by a single processor, while in other aspects, different ones of the functions may be executed by a combination of two or more different processors. For example, in an aspect, one or more processors of base station 910 may include any one or any combination of a modem processor, or a baseband processor, or a digital signal processor, or a transmit processor, or a receiver processor, or a transceiver processor associated with a transceiver. In other aspects, some of the features of modem 141 and/or SPS component 143 may be performed by a transceiver 918 of base station 910. Also, memory 976 of base station 910 may be configured to store data used herein and/or local versions of applications 875 or SPS component 143 and/or one or more of its subcomponents being executed by one or more processors of base station 910. In an aspect, for example, memory 976 may be a non-transitory computer-readable storage medium that stores one or more computer-executable codes defining SPS component 143 and/or one or more of its subcomponents, and/or data associated therewith, when base station 910 is operating at least one processor to execute SPS component 143 and/or one or more of its subcomponents.

Further, in an aspect, one or more components of UE 950 may implement applications 275, modem 140, and/or SPS component 142 described above with reference to FIG. 7. For example, in an aspect, one or more processors of UE 950 (e.g., TX processor 968, RX processor 956, controller/processor 959, etc.) can include modem 140 and/or can be part of modem 140 that uses one or more modem processors. In an aspect, the various functions related to SPS component 142 may be included in modem 140 and/or one or more processors of UE 950 and, in an aspect, can be executed by a single processor, while in other aspects, different ones of the functions may be executed by a combination of two or more different processors. For example, in an aspect, one or more processors of UE 950 may include any one or any combination of a modem processor, or a baseband processor, or a digital signal processor, or a transmit processor, or a receiver processor, or a transceiver processor associated with a transceiver. In other aspects, some of the features of modem 140 and/or SPS component 142 may be performed by a transceiver 954 of UE 950. Also, memory 960 of UE 950 may be configured to store data used herein and/or local versions of applications 275 or SPS component 142 and/or one or more of its subcomponents being executed by one or more processors of UE 950. In an aspect, for example, memory 960 may be a non-transitory computer-readable storage medium that stores one or more computer-executable codes defining SPS component 142 and/or one or more of its subcomponents, and/or data associated therewith, when UE 950 is operating at least one processor to execute SPS component 142 and/or one or more of its subcomponents.

In the DL, IP packets from the EPC 160 may be provided to a controller/processor 975. The controller/processor 975 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 975 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 916 and the receive (RX) processor 970 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 916 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 974 may be used to determine the coding and modulation scheme, as well as for spatial processing. The channel estimate may be derived from a reference signal and/or channel condition feedback transmitted by the UE 950. Each spatial stream may then be provided to a different antenna 920 via a separate transmitter 918TX. Each transmitter 918TX may modulate an RF carrier with a respective spatial stream for transmission.

At the UE 950, each receiver 954RX receives a signal through its respective antenna 952. Each receiver 954RX recovers information modulated onto an RF carrier and provides the information to the receive (RX) processor 956. The TX processor 968 and the RX processor 956 implement layer 1 functionality associated with various signal processing functions. The RX processor 956 may perform spatial processing on the information to recover any spatial streams destined for the UE 950. If multiple spatial streams are destined for the UE 950, they may be combined by the RX processor 956 into a single OFDM symbol stream. The RX processor 956 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 910. These soft decisions may be based on channel estimates computed by the channel estimator 958. The soft decisions are then decoded and deinterleaved to recover the data and control signals that were originally transmitted by the base station 910 on the physical channel. The data and control signals are then provided to the controller/processor 959, which implements layer 3 and layer 2 functionality.

The controller/processor 959 can be associated with a memory 960 that stores program codes and data. The memory 960 may be referred to as a computer-readable medium. In the UL, the controller/processor 959 provides demultiplexing between transport and logical channels, packet reassembly, deciphering, header decompression, and control signal processing to recover IP packets from the EPC 160. The controller/processor 959 is also responsible for error detection using an ACK and/or NACK protocol to support HARQ operations.

Similar to the functionality described in connection with the DL transmission by the base station 910, the controller/processor 959 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 958 from a reference signal or feedback transmitted by the base station 910 may be used by the TX processor 968 to select the appropriate coding and modulation schemes, and to facilitate spatial processing. The spatial streams generated by the TX processor 968 may be provided to different antenna 952 via separate transmitters 954TX. Each transmitter 954TX may modulate an RF carrier with a respective spatial stream for transmission.

The UL transmission is processed at the base station 910 in a manner similar to that described in connection with the receiver function at the UE 950. Each receiver 918RX receives a signal through its respective antenna 920. Each receiver 918RX recovers information modulated onto an RF carrier and provides the information to a RX processor 970.

The controller/processor 975 can be associated with a memory 976 that stores program codes and data. The memory 976 may be referred to as a computer-readable medium. In the UL, the controller/processor 975 provides demultiplexing between transport and logical channels, packet reassembly, deciphering, header decompression, control signal processing to recover IP packets from the UE 950. IP packets from the controller/processor 975 may be provided to the EPC 160. The controller/processor 975 is also responsible for error detection using an ACK and/or NACK protocol to support HARQ operations.

At least one of the TX processor 968, the RX processor 956, and the controller/processor 959 may be configured to perform aspects in connection with SPS component 142 of UE 104 in FIG. 1.

At least one of the TX processor 916, the RX processor 970, and the controller/processor 975 may be configured to perform aspects in connection with SPS component 143 of base station 102 in FIG. 1.

Some Further Example Implementations

An example method for wireless communication for a user equipment (UE), comprising receiving, by the UE, an activation/reactivation downlink control information (DCI) from a base station, the activation/reactivation DCI including an update to a periodically-occurring scheduling, wherein an absolute time for the update to take effect is specified in a radio resource control (RRC) configuration of the activation/reactivation DCI; and applying the update to the periodically-occurring scheduling for communications of the UE beginning at and following the absolute time.

The above method of wireless communication for a user equipment (UE), wherein the periodically-occurring scheduling comprises a semi-persistent scheduling (SPS) or configured grant (CG) parameter, wherein the absolute time is common to a group of UEs including the UE, wherein updates to one or more SPS or CG parameters of the group of UEs take effect simultaneously at the absolute time.

Any of the above methods of wireless communication for a user equipment (UE), wherein the absolute time is after an end of the activation/reactivation DCI.

Any of the above methods of wireless communication for a user equipment (UE), wherein the absolute time is a next boundary within a set of periodic time boundaries.

Any of the above methods of wireless communication for a user equipment (UE), wherein the absolute time is expressed in a frame index, a subframe index, a slot index, or a symbol index.

An example method for wireless communication for a user equipment (UE), comprising receiving, by the UE, at least one downlink communication from a base station, the at least one downlink communication including an update to a plurality of semi-persistent scheduling (SPS) or configured grant (CG) parameters; determining an action time for the update to take effect for each of the plurality of SPS or CG parameters, wherein the action time is a function of a type of each of the plurality of SPS or CG parameters, wherein the action time is selected from a group including at least a first action time associated with a first type of parameter and a second action time associated with a second type of parameter, the second action time being different than the first action time; and applying the update to respective ones of the plurality of SPS or CG parameters for communications of the UE beginning at and following each respective action time for the respective ones of the plurality SPS or CG parameters.

The above method of wireless communication for a user equipment (UE), wherein the first action time is a first periodic time boundary after the downlink communication and the second action time is a second periodic time boundary after the downlink communication, the first periodic time boundary being different than the second periodic time boundary.

Any of the above methods of wireless communication for a user equipment (UE), wherein each action time is specified in the downlink communication.

Any of the above methods of wireless communication for a user equipment (UE), wherein receiving the at least one downlink communication comprises receiving at least one of an activation/reactivation downlink control information (DCI) or a medium access control (MAC) control element (CE) or a radio resource control (RRC) signaling that includes each action time that updates the plurality of SPS or CG parameters.

Any of the above methods of wireless communication for a user equipment (UE), wherein the at least one downlink communication comprises an activation/reactivation downlink control information (DCI) indicating an updated scheduling offset, the method further comprising: applying the updated scheduling offset for the communications of the UE beginning at and following the first action time, wherein the first action time coincides with an end of a transmission of the activation/reactivation DCI.

Any of the above methods of wireless communication for a user equipment (UE), wherein the activation/reactivation DCI further indicates an updated non-scheduling parameter, the method further comprising: applying the updated non-scheduling parameter for the communications of the UE beginning at and following the second action time, wherein the second action time coincides with an amount of time after the end of the transmission of the activation/reactivation DCI.

Any of the above methods of wireless communication for a user equipment (UE), wherein the communications of the UE comprise a physical downlink shared channel (PDSCH) or a physical uplink shared channel (PUSCH), wherein the updated scheduling offset comprises a K0 or a K2.

Any of the above methods of wireless communication for a user equipment (UE), wherein the second action time is specified as a K0 or a K2 plus a time delay.

Any of the above methods of wireless communication for a user equipment (UE), further comprising: identifying a transient period that starts with the activation/reactivation DCI and ends with a first updated scheduled transmission according to the updated scheduling parameter indicated in the activation/reactivation DCI.

Any of the above methods of wireless communication for a user equipment (UE), further comprising: skipping communication of scheduled transmissions that are according to a previous SPS or CG configuration in the transient period.

Any of the above methods of wireless communication for a user equipment (UE), further comprising: determining whether to allow communication of a scheduled transmission that is according to a previous SPS or CG configuration in the transient period.

Any of the above methods of wireless communication for a user equipment (UE), wherein the determining whether to allow the communication of the scheduled transmission comprises: skipping the communication of the scheduled communication in response to the scheduled communication comprising a physical downlink shared channel (PDSCH) with an uplink feedback resource that is after the first updated scheduled transmission; and allowing the communication of the scheduled communication otherwise.

Any of the above methods of wireless communication for a user equipment (UE), wherein the determining whether to allow the communication of the scheduled transmission comprises: skipping the communication of the scheduled communication in response to the scheduled communication comprising a physical downlink shared channel (PDSCH) with a same hybrid automatic repeat request (HARQ) identifier (ID) as the first updated scheduled transmission and an uplink feedback resource that is after the first updated scheduled transmission; and allowing communication of the scheduled communication otherwise.

Any of the above methods of wireless communication for a user equipment (UE), wherein the determining whether to allow the communication of the scheduled transmission comprises: skipping the communication of the scheduled communication in response to the scheduled communication overlapping with the first updated scheduled transmission; and allowing the communication of the scheduled communication otherwise.

A user equipment (UE) for wireless communication, comprising a transceiver; a memory configured to store instructions; and one or more processors communicatively coupled with the transceiver and the memory, wherein the one or more processors are configured to execute the instructions to perform the operations of any of the above methods of wireless communication for a user equipment (UE).

An apparatus for wireless communication, comprising means for performing the operations of any of the above methods of wireless communication for a user equipment (UE).

A computer-readable medium, comprising code executable by one or more processors to perform the operations of any of the above methods of wireless communication for a user equipment (UE).

An example method for wireless communication for a base station, comprising transmitting, by the base station, an activation/reactivation downlink control information (DCI) to a user equipment (UE), the activation/reactivation DCI including an update to a periodically-occurring scheduling, wherein an absolute time for the update to take effect is specified in a radio resource control (RRC) configuration of the activation/reactivation DCI; and applying the update to the periodically-occurring scheduling for communications with the UE beginning at and following the absolute time.

The above method for wireless communication for a base station, wherein the periodically-occurring scheduling comprises a semi-persistent scheduling (SPS) or configured grant (CG) parameter, wherein the absolute time is common to a group of UEs including the UE, wherein updates to one or more SPS or CG parameters of the group of UEs take effect simultaneously at the absolute time.

Any of the above methods for wireless communication for a base station, wherein the absolute time is after an end of the activation/reactivation DCI.

Any of the above methods for wireless communication for a base station, wherein the absolute time is a next boundary within a set of periodic time boundaries.

Any of the above methods for wireless communication for a base station, wherein the absolute time is expressed in a frame index, a subframe index, a slot index, or a symbol index.

An example method for wireless communication for a base station, comprising transmitting, by the base station, at least one downlink communication to a user equipment (UE), the at least one downlink communication including an update to a plurality of semi-persistent scheduling (SPS) or configured grant (CG) parameters; determining an action time for the update to take effect for each of the plurality of SPS or CG parameters, wherein the action time is a function of a type of each of the plurality of SPS or CG parameters, wherein the action time is selected from a group including at least a first action time associated with a first type of parameter and a second action time associated with a second type of parameter, the second action time being different than the first action time; and applying the update to respective ones of the plurality of SPS or CG parameters for communications with the UE beginning at and following each respective action time for the respective ones of the plurality SPS or CG parameters.

The above method for wireless communication for a base station, wherein the first action time is a first periodic time boundary after the downlink communication and the second action time is a second periodic time boundary after the downlink communication, the first periodic time boundary being different than the second periodic time boundary.

Any of the above methods for wireless communication for a base station, wherein each action time is specified in the downlink communication.

Any of the above methods for wireless communication for a base station, wherein transmitting the at least one downlink communication comprises transmitting at least one of an activation/reactivation downlink control information (DCI) or a medium access control (MAC) control element (CE) or a radio resource control (RRC) signaling that includes each action time that updates the plurality of SPS or CG parameters.

Any of the above methods for wireless communication for a base station, wherein the at least one downlink communication comprises an activation/reactivation downlink control information (DCI) indicating an updated scheduling offset, the method further comprising: applying the updated scheduling offset for the communications with the UE beginning at and following the first action time, wherein the first action time coincides with an end of a transmission of the activation/reactivation DCI.

Any of the above methods for wireless communication for a base station, wherein the activation/reactivation DCI further indicates an updated non-scheduling parameter, the method further comprising: applying the updated non-scheduling parameter for the communications with the UE beginning at and following the second action time, wherein the second action time coincides with an amount of time after the end of the transmission of the activation/reactivation DCI.

Any of the above methods for wireless communication for a base station, wherein the communications with the UE comprise a physical downlink shared channel (PDSCH) or a physical uplink shared channel (PUSCH), wherein the updated scheduling offset comprises a K0 or a K2.

Any of the above methods for wireless communication for a base station, wherein the second action time is specified as a K0 or a K2 plus a time delay.

Any of the above methods for wireless communication for a base station, further comprising: identifying a transient period that starts with the activation/reactivation DCI and ends with a first updated scheduled transmission according to the updated scheduling parameter indicated in the activation/reactivation DCI.

Any of the above methods for wireless communication for a base station, further comprising: skipping communication of scheduled transmissions that are according to a previous SPS or CG configuration in the transient period.

Any of the above methods for wireless communication for a base station, further comprising: determining whether to allow communication of a scheduled transmission that is according to a previous SPS or CG configuration in the transient period.

Any of the above methods for wireless communication for a base station, wherein the determining whether to allow the communication of the scheduled transmission comprises: skipping the communication of the scheduled communication in response to the scheduled communication comprising a physical downlink shared channel (PDSCH) with an uplink feedback resource that is after the first updated scheduled transmission; and allowing the communication of the scheduled communication otherwise.

Any of the above methods for wireless communication for a base station, wherein the determining whether to allow the communication of the scheduled transmission comprises: skipping the communication of the scheduled communication in response to the scheduled communication comprising a physical downlink shared channel (PDSCH) with a same hybrid automatic repeat request (HARQ) identifier (ID) as the first updated scheduled transmission and an uplink feedback resource that is after the first updated scheduled transmission; and allowing communication of the scheduled communication otherwise.

Any of the above methods for wireless communication for a base station, wherein the determining whether to allow the communication of the scheduled transmission comprises: skipping the communication of the scheduled communication in response to the scheduled communication overlapping with the first updated scheduled transmission; and allowing the communication of the scheduled communication otherwise.

A base station for wireless communication, comprising a transceiver; a memory configured to store instructions; and one or more processors communicatively coupled with the transceiver and the memory, wherein the one or more processors are configured to execute the instructions to perform the operations of any of the above methods for wireless communication for a base station.

An apparatus for wireless communication, comprising means for performing the operations of any of the above methods for wireless communication for a base station.

A computer-readable medium, comprising code executable by one or more processors to perform the operations of any of the above methods for wireless communication for a base station.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), comprising:
   receiving, by the UE, an activation/reactivation downlink control information (DCI) from a base station, the activation/reactivation DCI including an update to a periodically-occurring scheduling parameter, wherein an absolute time for the update to take effect is specified in a radio resource control (RRC) configuration of the activation/reactivation DCI; and
   applying the update to the periodically-occurring scheduling parameter for communications of the UE beginning at and following the absolute time, wherein the absolute time is common to a group of UEs including the UE, wherein updates to one or more periodically-occurring scheduling parameters of the group of UEs take effect at the absolute time.

2. The method of claim 1, wherein the one or more periodically-occurring scheduling parameters comprises a semi-persistent scheduling (SPS) parameter or a configured grant (CG) parameter.

3. The method of claim 1, wherein the absolute time is after an end of the activation/reactivation DCI.

4. The method of claim 1, wherein the absolute time is a next boundary within a set of periodic time boundaries.

5. The method of claim 1, wherein the absolute time is expressed in a frame index, a subframe index, a slot index, or a symbol index.

6. A user equipment (UE) for wireless communication, comprising:
   a transceiver;
   a memory configured to store instructions; and
   one or more processors communicatively coupled with the transceiver and the memory, wherein the one or more processors are configured to:
      receive, by the UE, an activation/reactivation downlink control information (DCI) from a base station, the activation/reactivation DCI including an update to a periodically-occurring scheduling parameter, wherein an absolute time for the update to take effect is specified in a radio resource control (RRC) configuration of the activation/reactivation DCI; and
      apply the update to the periodically-occurring scheduling parameter for communications of the UE beginning at and following the absolute time, wherein the absolute time is common to a group of UEs including the UE, wherein updates to one or more periodically-occurring scheduling parameters of the group of UEs take effect at the absolute time.

7. The UE of claim 6, wherein the one or more periodically-occurring scheduling parameters comprises a semi-persistent scheduling (SPS) parameter or a configured grant (CG) parameter.

8. The UE of claim 6, wherein the absolute time is after an end of the activation/reactivation DCI.

9. The UE of claim 6, wherein the absolute time is a next boundary within a set of periodic time boundaries.

10. The UE of claim 6, wherein the absolute time is expressed in a frame index, a subframe index, a slot index, or a symbol index.

11. A method of wireless communication for a base station, comprising:
    transmitting, by the base station, an activation/reactivation downlink control information (DCI) to a user equipment (UE), the activation/reactivation DCI including an update to a periodically-occurring scheduling parameter, wherein an absolute time for the update to take effect is specified in a radio resource control (RRC) configuration of the activation/reactivation DCI; and
    applying the update to the periodically-occurring scheduling parameter for communications with the UE beginning at and following the absolute time, wherein the absolute time is common to a group of UEs including the UE, wherein updates to one or more periodically-occurring scheduling parameters of the group of UEs take effect at the absolute time.

12. The method of claim 11, wherein the one or more periodically-occurring scheduling parameters comprises a semi-persistent scheduling (SPS) parameter or a configured grant (CG) parameter.

13. The method of claim 11, wherein the absolute time is after an end of the activation/reactivation DCI.

14. The method of claim 11, wherein the absolute time is a next boundary within a set of periodic time boundaries.

15. The method of claim 11, wherein the absolute time is expressed in a frame index, a subframe index, a slot index, or a symbol index.

16. A base station for wireless communication, comprising:
    a transceiver;
    a memory configured to store instructions; and
    one or more processors communicatively coupled with the transceiver and the memory, wherein the one or more processors are configured to:
       transmit, by the base station, an activation/reactivation downlink control information (DCI) to a user equipment (UE), the activation/reactivation DCI including an update to a periodically-occurring scheduling parameter, wherein an absolute time for the update to take effect is specified in a radio resource control (RRC) configuration of the activation/reactivation DCI; and
       apply the update to the periodically-occurring scheduling parameter for communications with the UE beginning at and following the absolute time, wherein the absolute time is common to a group of UEs including the UE, wherein updates to one or more periodically-occurring scheduling parameters of the group of UEs take effect at the absolute time.

17. The base station of claim 16, wherein the one or more periodically-occurring scheduling parameters comprises a semi-persistent scheduling (SPS) parameter or a configured grant (CG) parameter.

18. The base station of claim 16, wherein the absolute time is after an end of the activation/reactivation DCI.

19. The base station of claim 16, wherein the absolute time is a next boundary within a set of periodic time boundaries.

20. The base station of claim 16, wherein the absolute time is expressed in a frame index, a subframe index, a slot index, or a symbol index.

\* \* \* \* \*